United States Patent [19]

Leonard

[11] Patent Number: 4,925,201
[45] Date of Patent: May 15, 1990

[54] VARIABLE-RATIO TRANSMISSIONS, SEPARATELY AND IN BICYCLES

[75] Inventor: George H. Leonard, Darien, Conn.

[73] Assignee: Hamlin Transmission Company, Wilton, Conn.

[21] Appl. No.: 281,265

[22] Filed: Dec. 7, 1988

Related U.S. Application Data

[62] Division of Ser. No. 140,232, Dec. 31, 1987.

[51] Int. Cl.$^5$ .................. B62M 25/02; F16D 23/00
[52] U.S. Cl. ............................. 280/238; 192/64; 280/236; 280/260
[58] Field of Search ............... 280/200, 210, 236, 238, 280/259, 260, 261, 288.4; 192/64

[56] References Cited

U.S. PATENT DOCUMENTS

| | | | |
|---|---|---|---|
| 3,650,363 | 3/1972 | Cristie | 192/64 |
| 3,990,715 | 11/1976 | Shimada | 280/236 |
| 4,598,920 | 7/1986 | Dutil et al. | 280/261 |

*Primary Examiner*—David M. Mitchell
*Assistant Examiner*—Donald McGrehan
*Attorney, Agent, or Firm*—Perman & Green

[57] ABSTRACT

Drive mechanism, particularly for use with a bicycle, of the type having variable diameter drive and driven members connected by an endless belt which engages adjustable segments on the members. Through a control means the drive ratio can be adjusted to multiple, discrete settings. Belt wrap is maintained between the belt and the drive and driven members at all settings by two idlers which are independently supported for movement. A locking rail is used to release and secure the segments on the members and a split clutch is used with the driven member for easy rear wheel removal. The mechanism has a lost motion device to accommodate forward and rearward pedaling without harming the drive mechanism. The drive mechanism is modular in construction so it can be used with frames of varying sizes and the drive mechanism can be quickly removed from or assembled to the bicycle frame when replacement is desired.

5 Claims, 19 Drawing Sheets

FIG. 5.
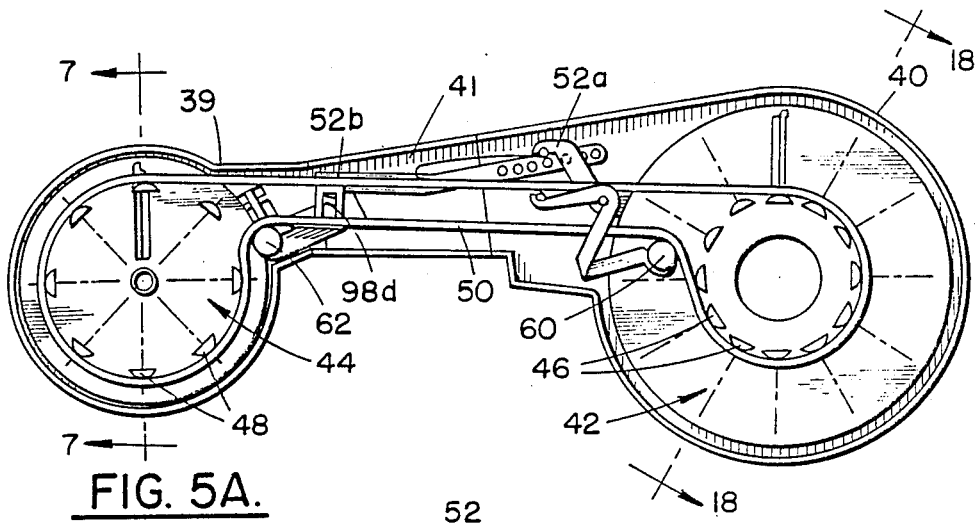
FIG. 5A.
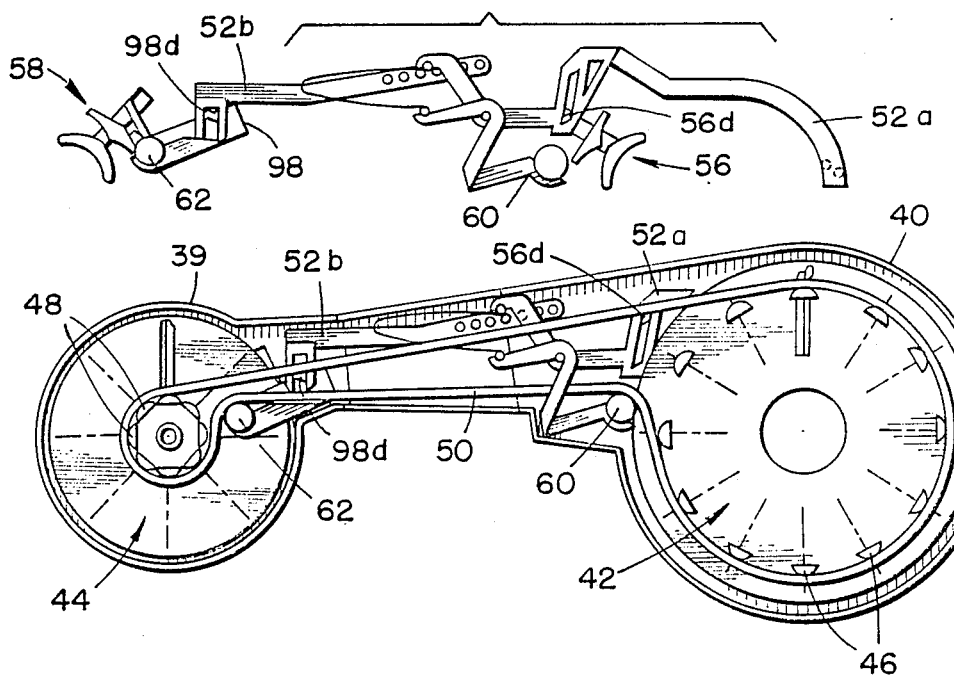
FIG. 6.

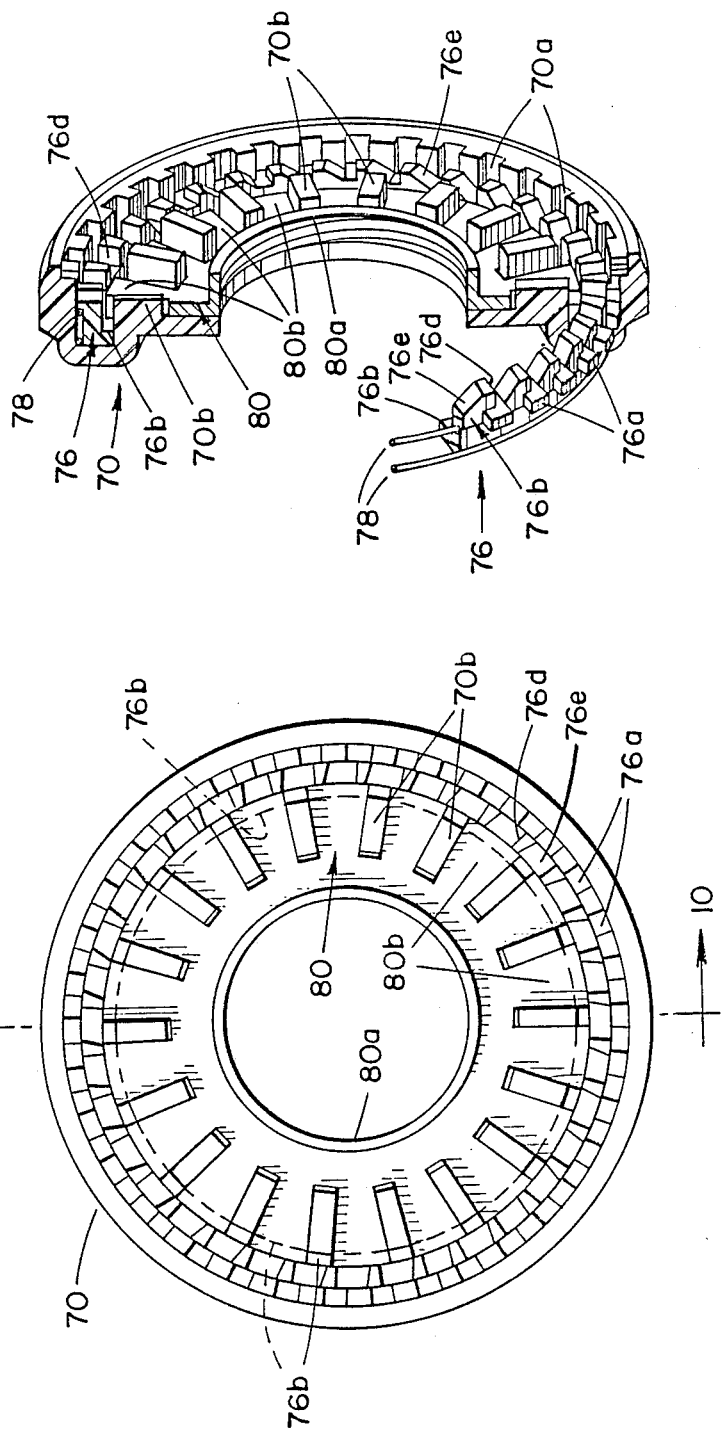

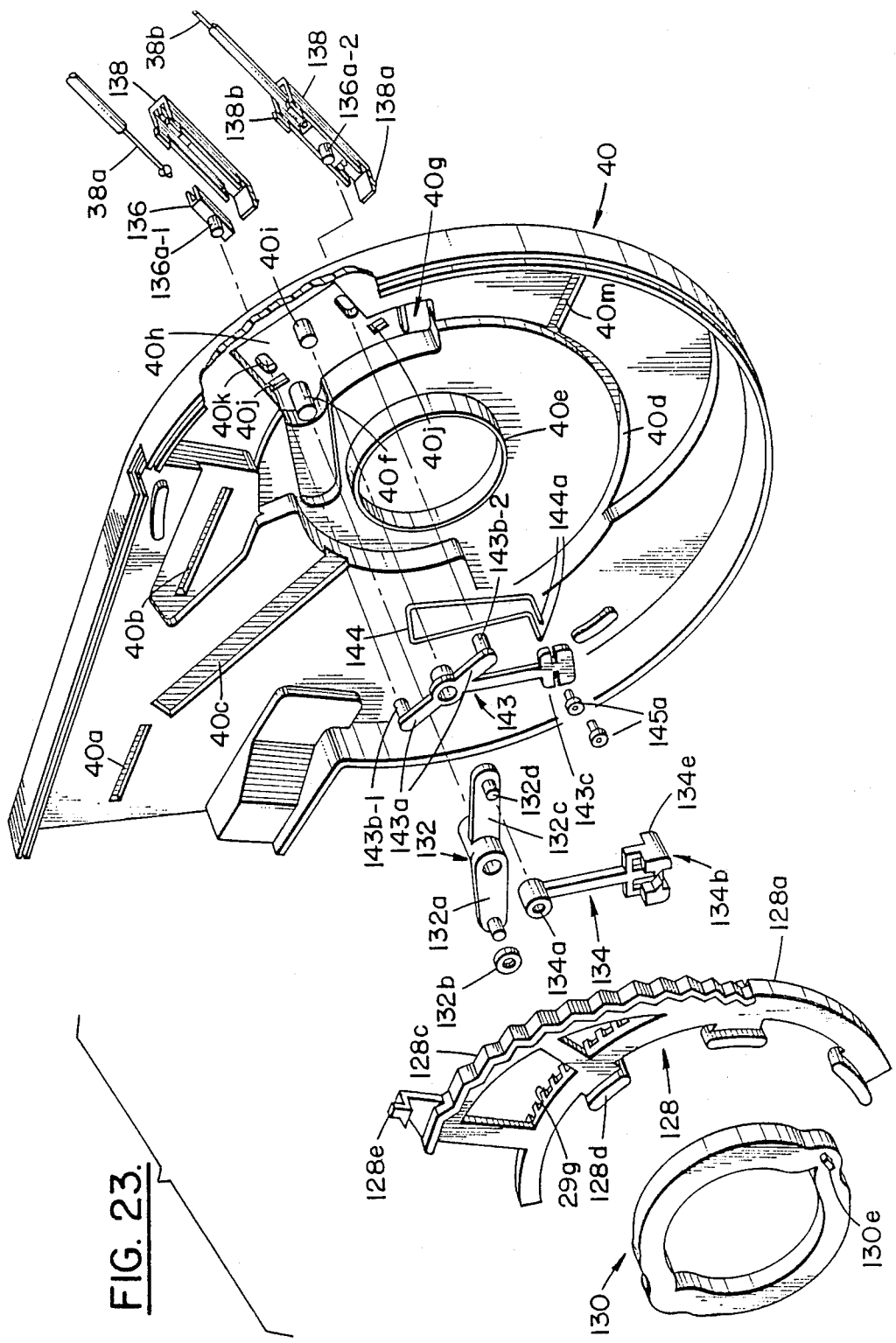

VARIABLE-RATIO TRANSMISSIONS, SEPARATELY AND IN BICYCLES

BACKGROUND OF THE INVENTION

The present invention relates to variable ratio transmission or drive system generally and to bicycles equipped with such mechanisms.

Bicycles equipped with chain-driven multi-speed transmissions called "derailleurs" have become popular world-wide. Derailleurs enable the bicycle rider to select various "speeds" for various slopes of the road and to accommodate the different needs of vigorous and weaker riders. A selected "speed" of a bicycle transmission identifies the ratio of the number of turns of the pedal crank to the resulting number of turns of the driven rear wheel.

A vigorous rider will choose a high speed or transmission ratio for riding down-hill or along a level road so that pedalling at a reasonable rate causes the bicycle to travel fast, and the same rider will choose a different ratio, a low speed, when riding slowly up-hill or on a poor road such as gravel.

Derailleurs with ten speeds are most common. A rider may wish that there were additional choices between the speeds of the ten-speed transmission, but derailleurs having more than ten speeds are uncommon because of increased cost, weight and troublesome complexity. A derailleur is inherently heavy due to its chain and many gears which are of metal, whereas bicycle riders have high regard for lightweight bicycles. Derailleurs lack an indicator to tell the rider which speed or ratio has been selected. And most derailleurs lack a housing so that the mechanism is exposed to rain, abrasive dirt, and other contaminants, leading to rust, wear and other damage. Finally, when a bicycle is equipped with a derailleur, it is difficult and cumbersome to remove and reassemble the rear wheel of the bicycle for replacing or repairing the tire. It is equally difficult to remove the whole transmission for replacement.

An alternative type of variable-ratio transmission for bicycles is disclosed in U.S. Pat. Nos. 4,030,373 and 4,530,676 in which I am the inventor. Both of these patents are incorporated herein by reference. That type of transmission includes a pair of adjustable sheaves coupled to each other by a belt. The present invention involves a novel transmission of that type.

In U.S. Pat. No. 4,030,373, a set of sheave segments are continuously adjustable radially on each of the two sheaves, so that fine locking teeth are required to maintain any adjustment. Additionally, the mechanism which locks each segment in any selected adjustment is made of tiny parts that are contained within each sheave segment. In practice, such tiny parts are preferably made of metal by die-casting; consequently, the parts are relatively expensive, and their large weight produce centrifugal forces. Manufacture of the rotary member can also be critical because warping of the rotary member under some circumstances may interfere with the necessary cooperation between an unlocking device which is disposed adjacent to the sheave at various distances from its axis and the locked sheave segments which are carried past the unlocking device as the sheave rotates.

In the transmission in U.S. Pat. No. 4,530,676, each of the sheaves also has a set of sheave segments that are adjustable. As an improvement over the '373 patent, the adjustments in '676 differ by discrete increments. A large number of discrete transmission ratios can be provided and relatively large locking teeth are used which are capable of withstanding much greater forces imposed on the sheave segments by the belt than in the '373 patent. Either of the sheaves in '676 can be used as the driving sheave in general applications of the transmission.

SUMMARY OF THE INVENTION

The present invention provides a novel, improved transmission of the type that includes two sheaves coupled to each other by a belt. In its broad aspect, the novel transmission is useful for widely varied purposes but certain attributes and added features render the transmission particularly useful in bicycles. In certain aspects of the invention, the novel transmission is an integral part of a bicycle. The variable ratio drive mechanism has a drive sheave means, a driven sheave means, and an endless member which drivingly couples the sheave means to each other. At least one of the sheave means includes a set of sheave segments, each sheave segment having a bearing surface engagable by the endless member and means for placing and securing the sheave segments to said one sheave means in any of a series of positions distributed on said one sheave means so that the bearing surfaces can be selectively positioned at a series of concentric circles. The endless member applies pressure to all the sheave segments except those in an adjustment zone of said one sheave means where the endless member is disengaged from the sheave segments. There is also provided gate means in the adjustment zone of said one sheave means for adjusting the sheave segments to a selected position.

The gate adjustment means of the mechanism may have a control means and actuating means and the drive means to operate the mechanism may be in the same means to effect displacement of the gate to discrete positions. The mechanism may have two endless member positioning means, one of which can be a force or tension applying means, adjacent the sheave means for positioning the endless member to maintain wrap, and in some instances maximum wrap, of the endless member around the sheave means, the endless member positioning means being independently supported for movement. The mechanism may have locking rail means adjacent the sheave segments which are operated between released and locked conditions to adjust the positions of the sheave segments. The mechanism may also have a one-way clutch between the driven sheave means and the output thereof, such as the rear wheel of a bicycle, to provide easy decoupling of the output from the driven sheave means. The mechanism, which is easily and quickly removed from its frame such as a bicycle frame for replacement, in tact, may also be made in a modular manner to be adaptable to frames of varying sizes.

It is eminently practical to provide a great many speeds, 21 speeds being provided in the example described in detail below as compared to 10 speeds of a widely used derailleur. Molded plastic parts may be used almost exclusively so that the cost and weight of the transmission are comparatively low. The entire mechanism is such that it can readily be enclosed in a housing for protection against rain, dirt and other contaminants. This is in contrast to derailleurs wherein it is impractical to provide a housing and where exposure of the mechanism leads to rusting and premature wear of its parts.

The novel transmission can be equipped with an indicator to show the rider (or the user, in other applications of the transmission) which transmission ratio has been selected. In contrast, it is impractical to provide a unitary speed indicator in usual derailleurs.

In a bicycle equipped with the novel transmission, the removal and reassembly of the rear wheel for repairing or replacing its tire is a simple matter. A one-way driving clutch between the ratio-changing mechanism and the rear wheel includes a driving clutch unit fixed to the belt-driven sheave and a driven clutch unit fixed to the bicycle's rear wheel. The driven clutch unit and the rear wheel form an assembly that is removable from the bicycle as one part. When the rear wheel is removed, the driven clutch unit simply separates harmlessly from the driving clutch unit. The driving and driven units of the clutch become coupled to each other automatically when the rear wheel is reassembled to the bicycle. This is in contrast to a much more complicated procedure for removing the rear wheel of bicycles equipped with derailleurs.

In general applications of the transmission described in detail below, either sheave can be used as the driving sheave. Moreover, the direction of rotation of the driving sheave can be reversed for special purposes when only a small amount of torque is required. When a bicycle is equipped with the novel transmission, its useful torque when operated in reverse enables the rider to change the transmission ratio by pedalling forward or backward, for example while coasting on a level road toward an uphill slope.

In transmissions having two belt-coupled sheaves, the belt includes a driving length that extends from one sheave to the other; the belt is wrapped partway around each sheave; and a return length of the belt extends from one sheave to the other around one or two spring-biased take-up rollers. In the transmission detailed below, an idler roller of each adjustable sheave is adjusted in coordination with the gate which controls the positions of the sheave segments. This assures engagement of the belt with an optimum number of the sheave segments of each sheave, and in this way a maximum torque can be transmitted at different transmission ratios.

In the present transmission, as in U.S. Pat. No. 4,530,676, the sheave segments are locked at discrete positions determined by the distribution of the teeth in the angularly distributed rows of teeth on each sheave. The teeth are of such large size that they are intrinsically strong and well adapted to withstand substantial pressure of the belt against each sheave segment. That gates that control the positioning of the sheave segments along the respective rows of teeth are operated by an adjusting mechanism to a series of discrete positions that track with the positions at which the sheave segments may be locked. For each adjustment, the set of sheave segments of each sheave move in a circular path and pass the gate in an adjustment zone where the belt does not bear against the passing sheave segments. This tracked relationship of the discrete positions of the sheave segments on each sheave and the discrete settings of the gate makes it possible, ideally, to avoid contact between the gates and the sheave segments, and to avoid related noise and wear, during the long periods of time when the sheaves turn while the adjustment is not being changed. In practice, there is some contact between the gate and the sheave segments. However, any such contact is not a critical factor because the sheave segments pass the gate only in an adjustment zone where the sheave segments are unlocked and the contact pressures are relatively light. The discrete steps of adjustment of the gates provide for discrete ratio settings of the transmission, and for a practical ratio indicator.

In one aspect of this invention, particularly significant in relation to a bicycle equipped with gates and adjustable sheaves, the gate-adjusting mechanism is operated in power strokes derived from the pedal crank, subject to the light effort of a finger-actuated control. The adjustment is made especially precise by including a stepped cam having dwells that correspond to the adjustments of the gates.

In the transmission described below, the pedal crank operates both the drive sheave and the gate-adjusting mechanism. There is danger of mis-operation if the pedal crank were oscillated repeatedly through small arcs as adjustment of the gates proceeds over a wide range. Some of the sheave segments might be shifted to new settings while others remain in their previous settings. Such mis-operation is precluded by providing a lost-motion mechanism between the gate-adjusting mechanism and the pedal crank that also turns the driving sheave.

As a distinctive aspect of the invention, a novel form of adjustable sheave is provided having sheave segments that are selectively adjusted by a gate along a related row of teeth and having a separate locking mechanism that maintains each selectively positioned sheave segment interlocked with the related row of teeth. The locking mechanism includes an elongated locking member or rail that extends along or opposite to the related row of teeth. Because the locking mechanism is not contained within each sheave segment, its components are not inherently tiny. Each locking rail has a distributed series of formations that are available all along the rail to force the sheave segment in any adjustment into inter-locked relation with the related row of teeth. The locking rails extend along or opposite to the rows of teeth and, to best advantage, they are shifted along their lengths in moving between their locking and releasing conditions. Their operation, as they move with the sheave segments into and out of the adjustment zone, depends upon operating elements located near each sheave's axis. Accordingly, any warping of the sheave that might occur does not affect the operation of the locking rails.

In common with the '676 patent, each adjustable sheave of the transmission described below has two discs that provide end support for each of its sheave segments. The belt bears against the sheave segments between the discs. The construction is inherently strong and stable. In the present construction, a separate locking rail is provided for each end of each sheave segment, and a coordinating flipper causes the locking rails to operate alike.

Each of the sheave segments has a toothed formation engagable with a companion row of teeth. Preferably each toothed formation includes a series of teeth. There may be a possibility arising of apex-to-apex abutment of a toothed formation and the related row of teeth when the locking rail is operated to enforce their interlocked relationship. That condition can be avoided (as explained below) for the sheave that is directly operated in coordination with the gate adjusting mechanism. The other sheave is operated by the belt. For that sheave, the mechanism that operates its locking rails includes a yieldable cam segment. As each sheave segment is carried out of the adjustment zone, the belt applies pressure to it so that the apex-to-apex condition is eliminated and then the yieldable cam segment instantly operates the related locking rails to their locked state.

In the coordination described below, the gate adjusts or readjusts each sheave segment as it moves through the adjustment zone. After each sheave segment leaves the gate and before it is locked in adjustment, centrifugal force might shift the sheave segments out of adjustment. To prevent such occurrence, the locking rails are spring-biased to hold the sheave segments engaged with their respective rows of teeth.

It should be understood that many of the foregoing features of the apparatus described below are useful apart from other described features and, of course, some of the features may be modified and used in other apparatus. Still other aspects of the invention are set forth below in the context of the detailed description. The apparatus described below and shown in the accompanying drawings represents an exemplary yet illustrative embodiment of the various aspects of the invention.

The following is a detailed description of an illustrative embodiment of the invention which is shown in the accompanying drawings. Where "right-side" and "left-side" appear below, those terms refer to the sides of the transmission at the right and left sides of the bicycle rider.

BRIEF DESCRIPTION OF THE DRAWINGS

FIG. 5 is a right-side elevation of the transmission of FIGS. 1 and 2, being enlarged compared to FIG. 1, the right-side cover and other right-side components of the transmission being removed, the transmission being shown in its lowest-speed ratio;

FIG. 5A is a right-side elevation of a coordinating adjustment mechanism forming part of the transmission shown in FIG. 5;

FIG. 6 is a view like FIG. 5, showing the transmission in its highest-speed ratio;

FIG. 9 is a right-side elevation of the wheel-mounted portion of the clutch, as seen from the plane 9—9 in FIG. 8 and drawn to larger scale;

FIG. 10 is a fragmentary perspective view partly in cross-section at the plane 10—10 in FIG. 9, of the wheel-mounted portion of the clutch;

FIG. 23 is a view like FIG. 22 showing other adjustment components;

DESCRIPTION OF THE PREFERRED EMBODIMENTS

Figure 1:
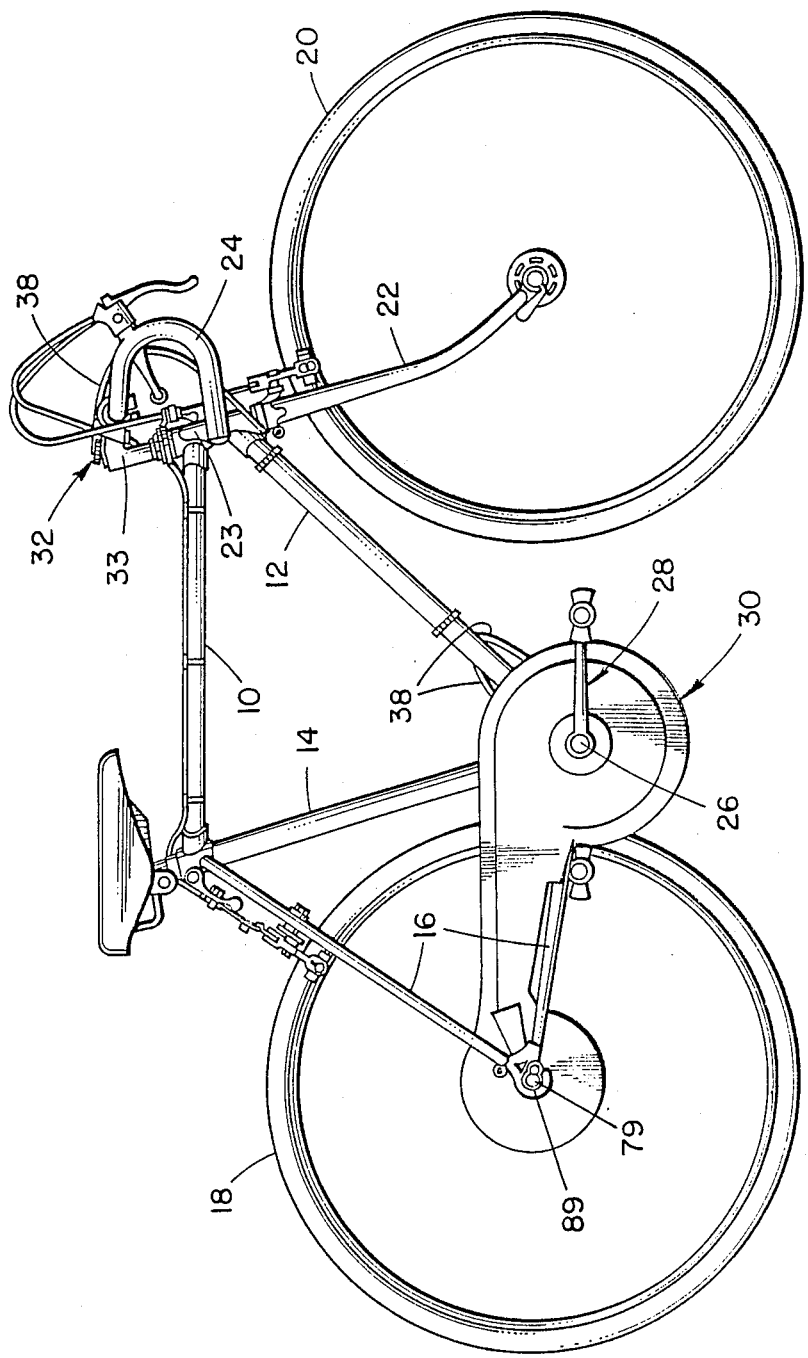
FIG. 1 is a right-side elevation of a typical commercial bicycle equipped with a novel transmission as an illustrative embodiment of the invention in its various aspects.

Referring now to the drawings, FIG. 1 shows an example of an available bicycle, modified to incorporate a novel transmission. The bicycle is shown in FIG. 1 as it is seen from its right-hand side (the right-hand side of the bicycle rider).

Figure 2:
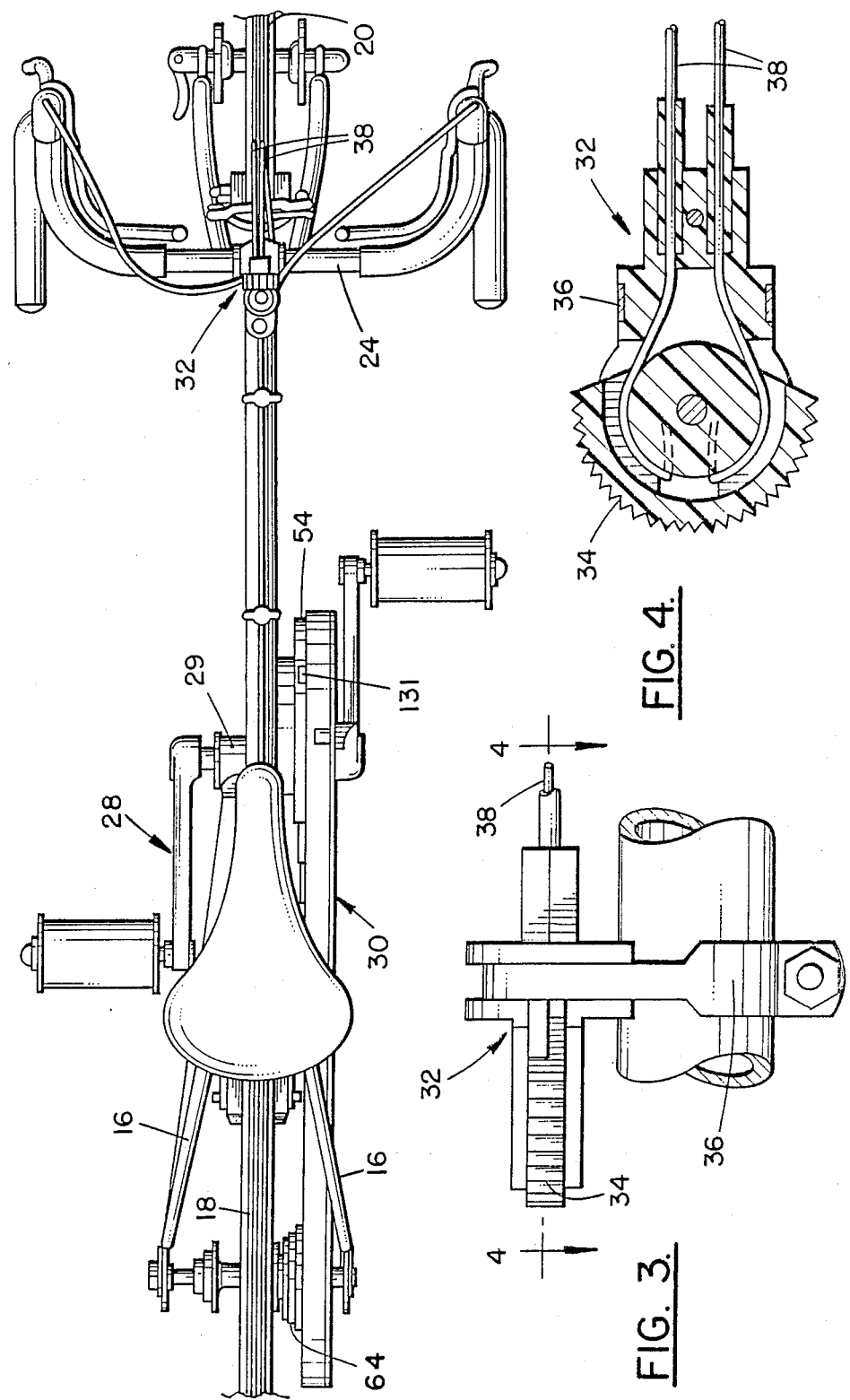
FIG. 2 is a top plan view of the bicycle of FIG. 1 drawn to larger scale, portions of the wheels being broken away.

The bicycle may include a frame having a horizontal top tube 10, down tube 12 and seat tube 14 united as a triangle, plus two rear-wheel supports 16, there being one rear-wheel support on each side of rear wheel 18 (FIGS. 1 and 2). The front wheel 20 is supported in a fork 22 that turns in head tube 23 which interconnects tubes 10 and 12. Handle bar 24 (FIGS. 1 and 2) operates the fork. Shaft 26 of a pedal crank 28 has a bearing 29 at the junction of down tube 12 and seat tube 14.

An adjustable-ratio transmission unit or drive mechanism 30 provides the drive coupling between pedal crank 28 and rear wheel 18. A manual transmission ratio control 32 (see also FIGS. 2, 3 and 4) includes a pivoted finger-actuated member 34 that is conveniently operable by the person riding the bicycle. Bracket 36 secures manual control 32 to the stem 33. The control also includes a pair of sheathed cords or cable means 38 operated by member 34 and extending to the transmission unit 30.

When finger-actuated member 34 is centered (see FIG. 4) the last-established ratio remains in effect. Shifting member 34 one way or the other has the effect of conditioning the transmission to change its own ratio in progressive steps using effort provided by the pedal crank. So long as member 34 remains off-center, continued operation of the pedal will cause, within the design limits, continuing step-by-step change in the transmission's ratio.

FIGS. 5 and 6 show the transmission at its lowest-speed and highest-speed adjustments, respectively. Totally enclosed transmission unit 30, which can be sealed against contaminants, includes a left-side wall made up of three unified, modular parts 39, 40 and 41. This construction makes it possible for parts 39 and 40 to be used for virtually all sizes of commercially available bicycles. Third part 41 is a selected length among a series of different lengths prepared for adapting the transmission unit to many different frame sizes of commercially available bicycles. In this manner, the drive mechanism can be made of an assembly of modular parts.

Transmission unit 30 includes an adjustable front sheave means 42 that is coaxial with and operated by pedal crank 28, and it includes a rear sheave means 44 that operates the rear wheel. Sheave 42 includes a series of radially adjustable sheave segments 46 and sheave 44 includes a series of radially adjustable sheave segments 48. An endless member or belt 50 is in driving or driven frictional contact with the sheave segments of both sheaves 42 and 44 nearly all the way around each set of sheave segments. When a selected transmission ratio is in effect, sheave segments 46 are locked at one common radius and sheave segments 48 are also locked at a common radius.

When sheave segments 46 are at their minimum-radius positions and sheave segments 48 are at their maximum-radius positions as in FIG. 5, the transmission is in its lowest speed adjustment. This means that the rear wheel will turn least for each rotation of the pedal crank. Conversely, when sheave segments 46 are at their largest-radius adjustment and sheave segments 48 are at their smallest-radius positions, as in FIG. 6, the transmission is set for most rotation of the rear wheel for each rotation of the pedal crank. The sizes and relationships thereof in FIGS. 5 and 6 are only illustrative and are of no particular scale.

A coordinating mechanism is provided for determining the radial settings of both sets of adjustable sheave segments. Both the front or pedal-driven sheave 42 and the rear sheave 44 are adjusted progressively in opposite directions in going through successive steps of adjustment. The coordinating mechanism (FIG. 5A) causes the radius of one sheave to increase one step and, at the same time, it causes the radius of the other sheave segment to decrease one step. In an alternative, it is contemplated that the front sheave and back sheave may be adjusted alternately (not concurrently) in response to successive steps of adjustment of the coordinating mechanism.

FIG. 5A represents an overall view of a mechanism for coordinating the adjustment of the front and rear sheaves. A control member 52, formed of front part 52a and rear part 52b extends from a ratio-adjusting mechanism 54 (see FIG. 2) inside the transmission casing, at the front of the transmission at the bicycle rider's left side. Mechanism 54 (see FIGS. 18 and 20-29) responds to the control effort provided by manual control 32 and cords 38, and provides ample drive effort (derived from the bicycle pedals) to shift the coordinating member 52 in steps for adjusting the transmission ratio.

Parts 52a and 52b of coordinating member 52 are adjustably secured to each other in a series of over-lapping positions corresponding to the incremental sizes of casing segment 41, for adapting the same set of transmission parts to a wide range of different frame sizes of commercial bicycles.

Coordinating member 52 operates front gate 56 and rear gate 58 for adjusting the front and rear sheaves, respectively. Coordinating member 52 also moves first and second endless member positioning means, idler rollers 60 and 62, correspondingly. The detailed description of the coupling between member 52 and both the gates and the rollers, and their operation, appears below. Adjustment of the idlers in coordination with the gates causes the belt to wrap most of the way around each sheave throughout the range of adjustment of the sheaves' radii. When the diameter of sheave segments 46 is at a minimum (FIG. 5) idler 60 is located closest to the axis of sheave 42 whereas, when the radius of sheave segments 46 is a maximum (FIG. 6), idler 60 is relatively far from the axis of sheave 42. In coordination with those adjustments, when the diameter of sheave 44 goes from maximum to minimum (FIGS. 5 and 6), idler 62 is shifted toward the axis of rear sheave 44. That adjustment of the idlers guides the lower or return length of the belt so that the belt is kept wrapped around most of each sheave and pressed against most of the sheave segments of each sheave, that is, maximum wrap, for all ratios of the transmission. This wrap-around condition enhances the tension that can be developed by sheave 42 in the upper or driving length of belt 50 and it enhances the torque that can be developed in sheave 44 of the rear wheel.

The rear end of the transmission that is associated with rear wheel 18 may now be described in detail. As seen in FIG. 2, the rear wheel 18 and the rear portion of the transmission are suitably supported between the spaced portions 16 of the bicycle frame. The driving part of the transmission is coupled to rear wheel 18 through a one-way driving clutch 64, an "over-running" clutch (FIGS. 2 and 7-10). The driving mechanism applies torque to the clutch and, in turn, to the rear wheel. However, when the bicycle is coasting, the rear wheel turns freely, over-running the slow or unmoving parts of the drive mechanism.

As is customary, the rear wheel 18 is removable so that the tire can be replaced or repaired. Clutch 64 has a driven part secured to the rear wheel and a driving part fixed to the adjustable-ratio drive. As will be seen below, the two parts of the clutch move apart readily when the rear wheel is being removed. When the rear wheel is being brought into place between frame parts 16, the two portions of the clutch become meshed directly.

Figure 7:
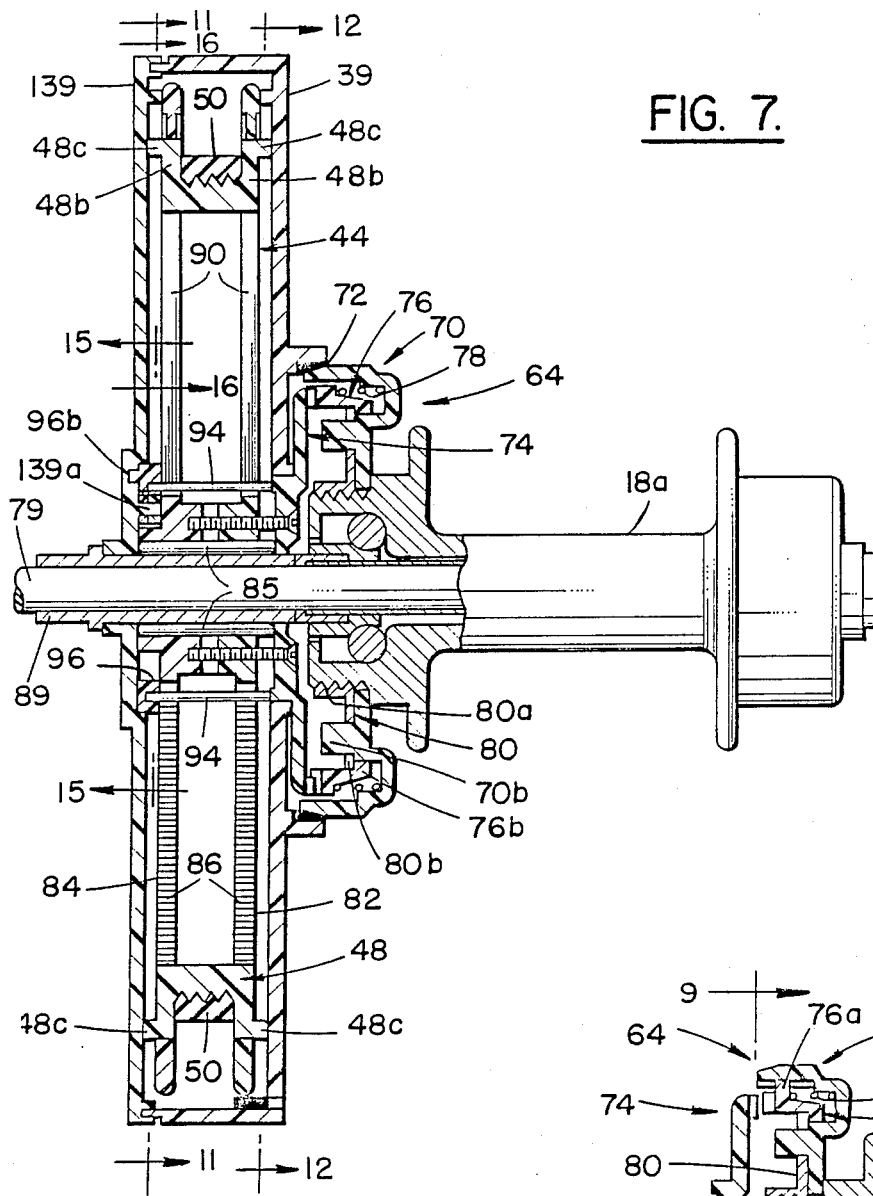
FIG. 7 is a cross-section of the transmission at the plane 7—7 in FIG. 5, drawn to larger scale, and part of the bicycle's rear wheel.
Figure 8:
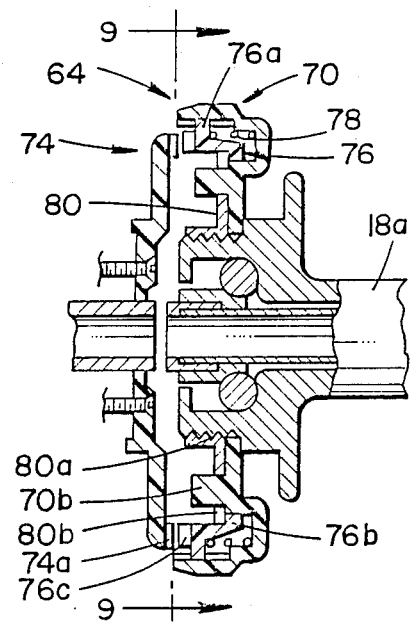
FIG. 8 is a detail of FIG. 7, showing parts of a clutch of FIG. 7 in a changed relationship.

As seen in FIG. 7, sheave 44 of transmission 30 is contained in a two-part casing including "back" wall 39 (the wall at the bicycle rider's left, as seen in FIG. 2) and "front" wall 139. A wall 70 is fixed to rear wheel 18 for enclosing the clutch mechanism. A gasket 72 provides a seal between stationary rear wall 39 of the transmission casing and rotating wall 70.

The parts of the clutch are shown in FIGS. 7–10. The drive part 74 of the clutch is fixed to sheave 44, as by screws. Sheave 44 is keyed to clutch part 74; these parts rotate in unison. The driven ring 76 of the clutch is axially slidable in rotating wall 70. Projections 76a of ring 76 are guided for axial sliding in matching grooves 70a in cover 70. A coil spring 78 presses clutch ring 76 axially toward the clutch's drive part 74. A metal part 80 has a portion 80a threaded to the hub 18a of rear wheel 18, securing clutch wall 70 to the hub. Projections 70b of wall 70 fit between fingers 80b of part 80; and fingers 80b overlie an inner circular shoulder 76b of clutch ring 76. (Shoulder 76b is shown in FIG. 10 spaced from fingers 80b, representing a condition that is mentioned below.) Fingers 80b limit the movement of ring 76 axially away from wall 70, to the left in FIGS. 7 and 8.

Clutch ring 76 has a first engagable means such as a series of driven clutch teeth 76c (FIG. 8) having drive flats 76d in planes that contain the clutch axis and, at the opposite side of each tooth there is a slant side 76e. Correspondingly, driving part 74 of the clutch has a second engagable means such as a circular series of teeth 74a that mesh with teeth 76c in the driving condition of the clutch and at rest. Each tooth 74a has a driving flat that is in a plane containing the clutch axis, and an opposite slant surface, corresponding to flats 76d and slant sides 76e.

In operation, when clutch part 74 develops driving torque, the flats of teeth 74a are in driving abutment with flats 76d of clutch teeth 76c. When the bicycle is coasting, the driving mechanism of the transmission does not turn clutch part 74 but rear wheel 18 continues to turn. The portion of the clutch that is fixed to wheel 18 over-runs clutch part 74. Clutch ring 76 continues to turn and causes clutch teeth 76c to ratchet past teeth 74a of clutch part 74 which is stationary. The slant surfaces 76e of teeth 76c slide up and along the slant surfaces of teeth 74a, depressing ring 76 (FIG. 10) intermittently.

When the rear wheel is to be removed, shaft 79 (FIG. 7) is removed, providing space for wheel 18 to be removed. Clutch ring 76 simply separates from the driving clutch part, as in FIG. 8. One clutch unit 70/76,80 plus rear wheel 18 form an assembly that separates from companion clutch unit 74 incidentally as the rear wheel is removed from the bicycle. Later, when the wheel is being mounted, clutch ring 76 confronts and moves into mesh with driving clutch part 74.

Shaft 79 is actually part of a quick disconnect system for quickly removing and assembling rear wheel 18 and rear sheave 44 from and to the frame. At the place where the wheel is supported by the frame on the left side of the bicycle (to the right in FIG. 7), the frame has a bearing surface, such as a bore through which shaft 79 can be inserted and supported. Also fixed to the outside of the frame in this region and aligned with the bore is a collar (not shown) with an L-shaped slot extending from its outer edge. Shaft 79 can have a pin (not shown) projecting perpendicularly from its longitudinal axis at one end. The pin on the shaft is of proper size as to fit through the slot in the collar. Shaft 79 through the engagement of its pin with the slot in the collar provides the well-known bayonet-type quick connect/disconnect system for the wheel and rear sheave. At the place where the wheel is supported by the frame in the right side of the bicycle (to the left in FIG. 7), the frame also has a bearing surface, such as a bore, adapted to support sleeve 79 on rear sheave 44.

To quickly assemble the rear wheel and rear sheave to the frame, one merely places sheave 79 into the bore on the right side of the frame, places the end of the shaft opposite the pin through the collar and bore on the left side of the frame, through hub 18a and finally into sleeve 79. As the shaft is inserted into sleeve 79, the pin on shaft 79 is aligned with and fed into the slot in the collar. To lock the entire assembly in place, the shaft is rotated by the pin into the foot portion of the L-shaped slot in the collar.

To quickly remove the rear wheel and rear sheave, shaft 79 is rotated by its pin to the position where the pin can be pulled out through the slot in the collar and the shaft pulled out of the frame. When this is done, the rear wheel drops out of the frame and the rear sheave can be removed by pulling its sleeve 79 out of the bore. Although a bayonet-type mechanism is described herein, any suitable mechanism may be used.

Figure 13:
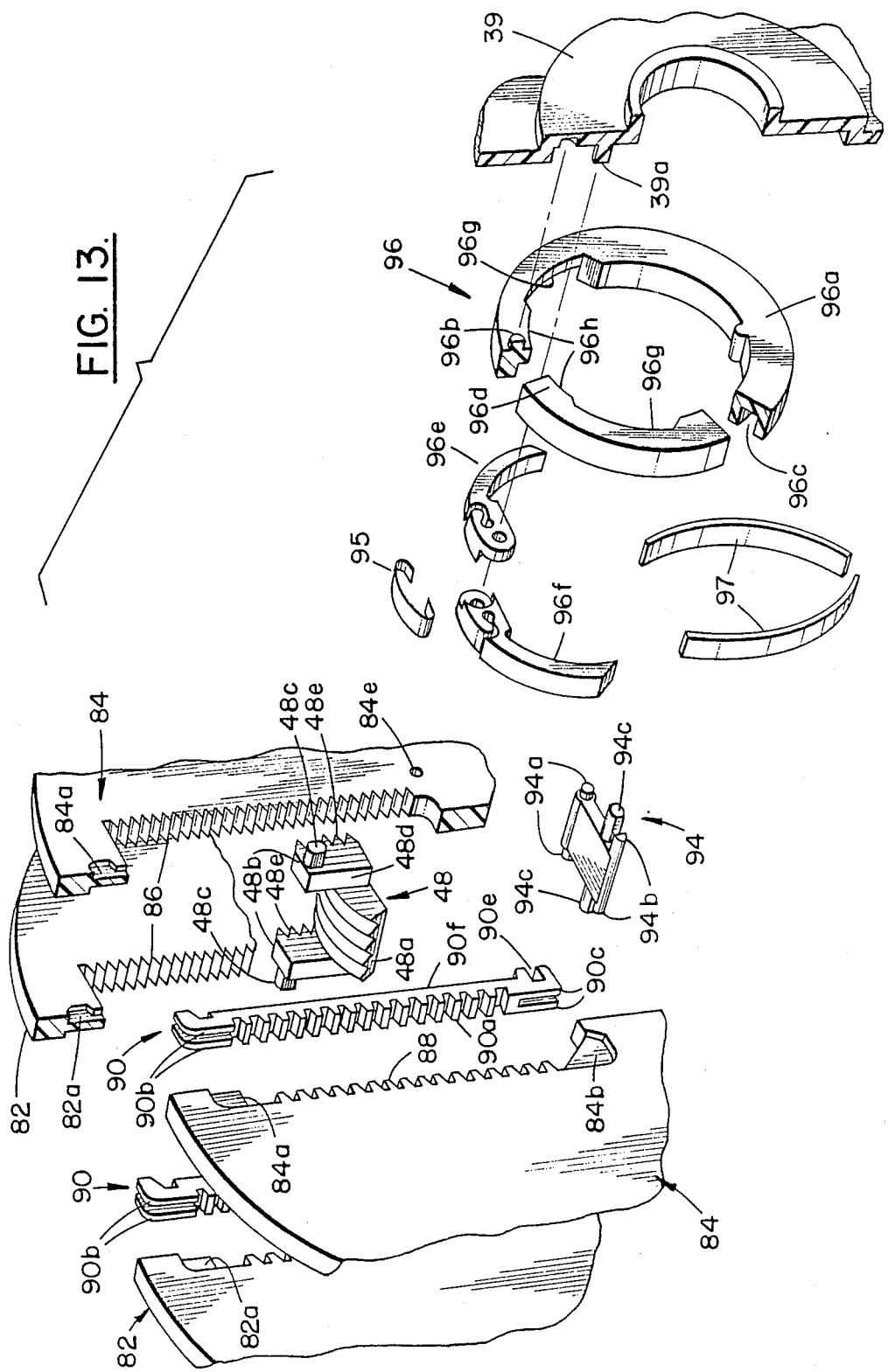
FIG. 13 is a fragmentary exploded perspective of parts of the transmission as viewed from the left side and in front of FIG. 7, drawn to larger scale.

Rear sheave 44 is shown in FIGS. 7, 11 and 13–16. In the form shown in FIG. 7, sheave 44 consists mainly of sheave segments 48 and two discs 82 and 84 which form a rotatable member united to clutch part 74 and supported on roller bearings 85. The discs are spaced apart but their hubs are keyed to each other and united. Discs 82 and 84 have a series of accurately distributed slots. Opposite elongated edges of each slot are parallel. One edge of each slot in each disc has a row of regular teeth 86 (FIG. 13). The sides of teeth 86 slant oppositely and they meet at sharp apexes and roots. In this example, teeth 86 of each slot in disc 82 are aligned with teeth 86 in disc 84 along lines parallel to the common axis of the discs.

Each sheave segment 48 of FIGS. 5 and 6 is shown in detail in FIG. 13. Sheave segment 48 includes a medial portion 48a which is grooved for mating cooperation with a complementary driving face of belt 50 as shown in FIG. 7. End portions 48b of the sheave segment are received in respective slots of discs 82 and 84.

Lateral surfaces of each portion 48b are aligned with inner and outer faces of discs 82 and 84, respectively (FIG. 7). Each sheave segment has a pair of nubbins 48c that project from the outer side surfaces of discs 82 and 84 (FIG. 7). One edge 48d of each portion 48b is flat and the opposite edge has a toothed formation, here a short row of teeth 48e that mate with teeth 86. In this way, each sheave segment can be locked to both discs at any adjustment along its related slot.

A locking rail means 90 is disposed in each slot of each disc. Long lateral surfaces of each rail 90 are flush or aligned with the inner and outer flat faces of discs 82 and 84. Each locking rail 90 has a set of teeth 90a distributed along its length. The edge of each slot opposite to the row of teeth 86 of each disc has teeth 88 complimentary to teeth 90a of the locking rail. Teeth 88 have flat tops that can be aligned with flat tops of rail teeth 90a as shown in FIG. 14 and teeth 88 have ramp surfaces that can slide against ramp surfaces of teeth 90a as shown in FIGS. 14A and 15B. The locking rails 90 (FIG. 13) have grooved formations 90b and 90c that receive and are guided along blades 84a and 84b of disc 84 and along blade 82a and another blade (not shown in FIG. 13) of disc 82. The flat portions 48d of the sheave segments slide along flat surfaces 90f of the locking rails.

A flipper 94 is positioned generally between discs 82 and 84 near the end of each aligned pair of slots in the discs nearest to the sheave's axis. A flipper 94 coordinates each pair of locking rails 90. Each flipper 94 has opposite pivots 94a received in hole 84e of disc 84 and in an opposite hole (not shown) in disc 82, and each flipper has operating portions 94b that fit snugly in recesses 90e of the locking rails. Flipper 94 also has cam followers 94c that project outside of sheave 44 to the right of disc 82 and to the left of disc 84 (FIG. 7). Only one cam follower 94c of each flipper is active in rear sheave 44, at the left in FIG. 7 and at the right in FIG. 13. Flippers 94 are also used in front sheave 42 (discussed below) and then only the opposite-side cam follower 94c is used. A cam assembly 96 (FIGS. 7, 13, 14, 14A, 14B, 15, 15A and 15B) operates flippers 94 of rear sheave 44, as described below.

Figure 11:
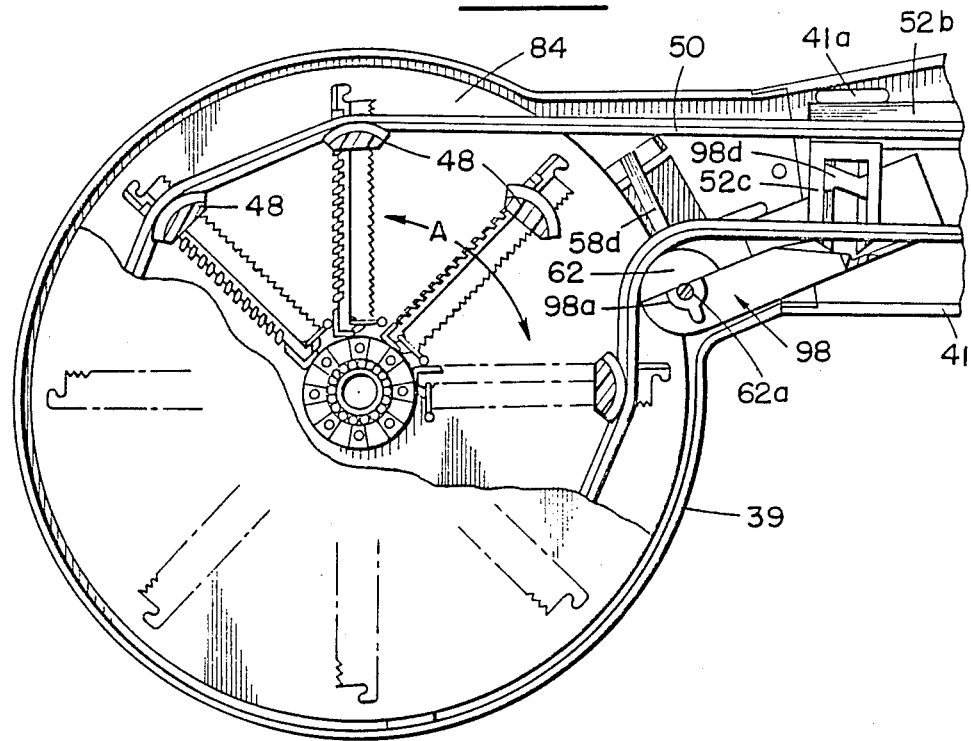
FIG. 11 is a right-side elevation of the rear-wheel portion of the transmission at the plane 11—11 of FIG. 7, in a slightly different ratio adjustment.

Belt 50 applies radial pressure to most of the sheave segments 48 (FIG. 11). The belt is disengaged from the sheave segments as they pass through adjustment zone A (FIG. 11). When the upper length of the belt is tensioned (FIG. 11), torque-developing force is transmitted from the belt via the engaged sheave segments to the discs 82 and 84. In the illustrated apparatus, rows of teeth 48e are provided (rather than only one tooth on each part 48b) for enabling the meshed teeth 48e/86 to withstand large belt-imposed forces. The meshed teeth are of a material such as plastic that yields somewhat when concentrated force develops at any particular tooth so that the total force applied to a sheave segment is distributed among the many meshed teeth. In turn, because there are several teeth 48e that mesh with any selected portion of the row of teeth 86, teeth 48e and 86 are regularly distributed.

Figure 14B:
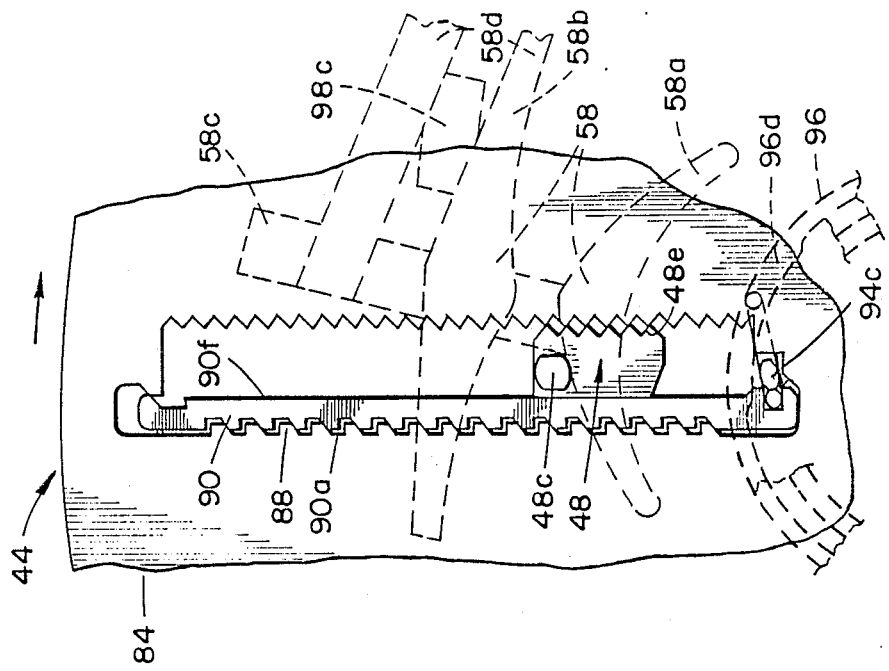
FIGS. 14, 14A, 14B and 14C are greatly enlarged fragmentary side elevations of parts of the transmission shown in FIGS. 7 and 13, representing certain components in various conditions.
Figure 14A:
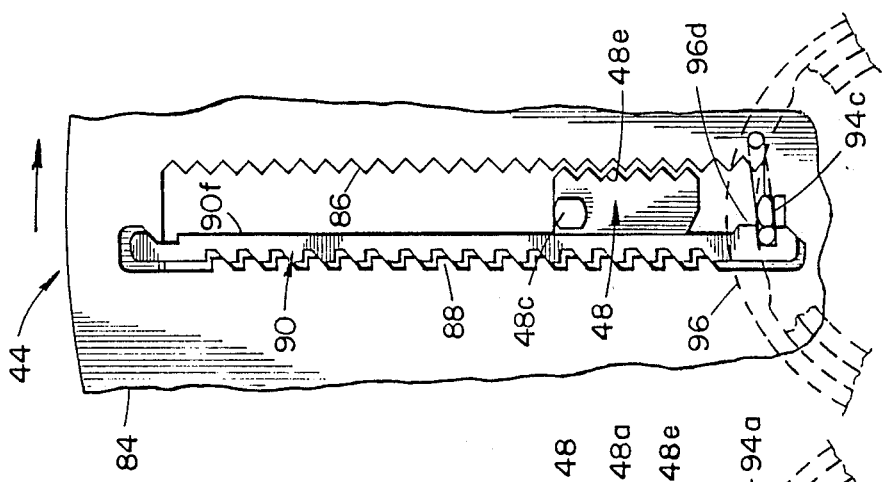
Figure 14:
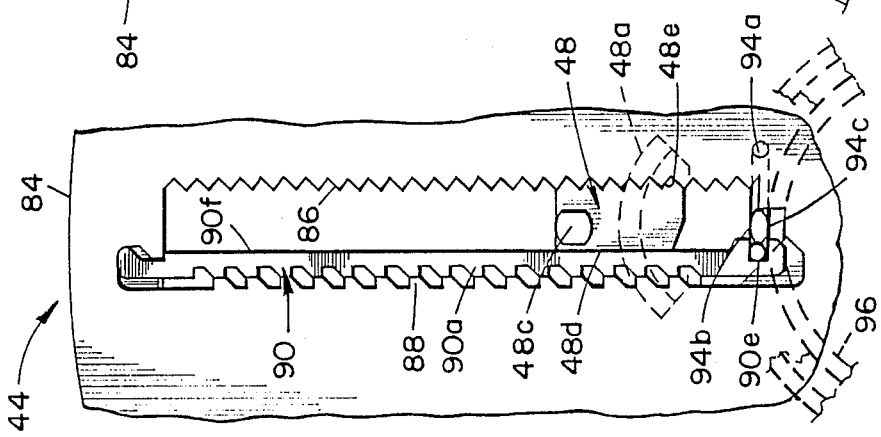

Referring to FIGS. 14, 14A and 14B, the operation of locking rails 90 may now be described.

FIG. 14 represents the condition of a sheave segment when outside the adjustment zone A of FIG. 11. Both of the looking rails 90 of the paired and aligned slots in discs 82 and 84 are in the sheave-locking state, i.e., the flat tops of teeth 88 abut the flat tops of teeth 90a of the locking rails. The long straight surfaces 90f of those locking rails engage the flat sides 48d of sheave segment 48. In this condition, locking rails 90 hold the two rows of teeth 48e of the sheave segment 48 firmly and fully meshed with respective rows of locking teeth 86 of discs 82 and 84. The radially inner wall of box cam 96 (FIG. 15) maintains flipper 94 of each sheave segment 48 in the locking position of FIG. 14, to hold paired locking rails 90 in their locked condition, so long as belt 50 bears against the sheave segment (see FIG. 11).

FIG. 14A shows sheave 44 with a sheave segment 48 near the center of adjustment zone A (FIG. 11) where there is no pressure of belt 50 against the sheave segment. Furthermore, FIG. 14A represents the condition of a sheave segment when no new adjustment of that sheave segment is to occur. Cam segment 96d (FIG. 15) forces flipper 94 generally inward radially (downward from FIG. 14 to FIG. 14A). Flipper 94 forces locking rails 90 to shift generally inward radially (down in FIG. 14A). Compared to FIG. 14, the flats of teeth 90a on the locking rails in FIG. 14A have been shifted off the flats of teeth 88. Teeth 48e are no longer held deeply meshed with teeth 86, and teeth 90a are free to enter the spaces between teeth 88. Paired rails 90 allow sheave segment 48 to be somewhat loose but still retained in position by teeth 48e and 86 that are partially meshed. The nubbins 48c of each sheave segment in zone A pass between the cams of gate 58 (see FIGS. 12 and 16).

Figure 12:
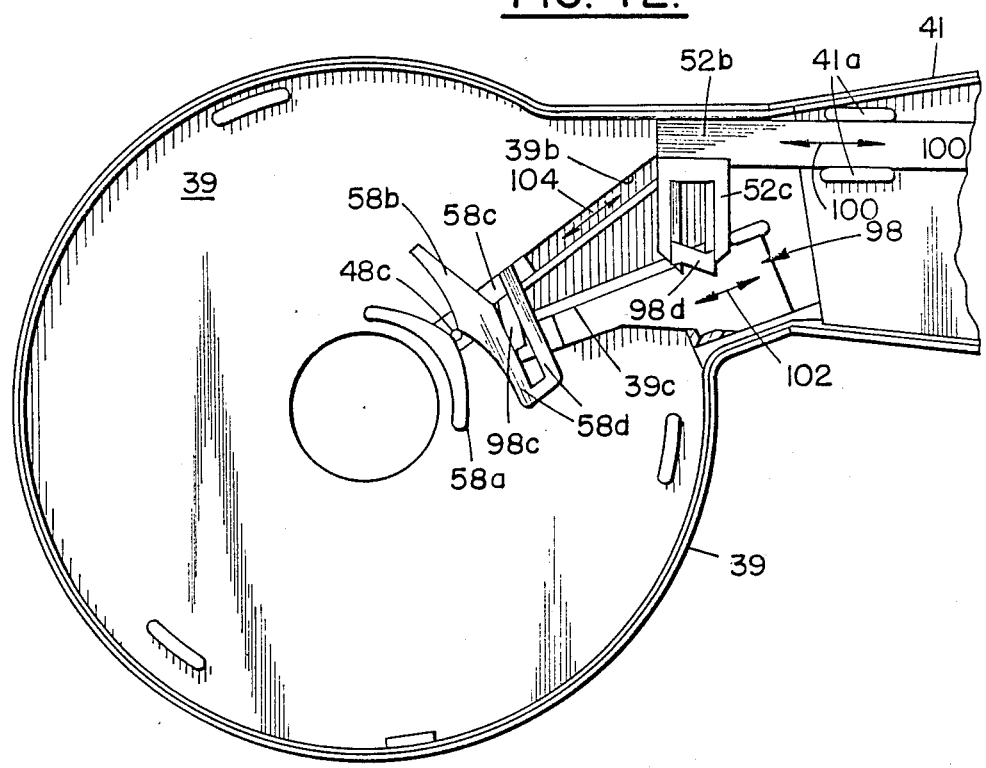
FIG. 12 is a view like FIG. 11 at the plane 12—12 in FIG. 7, with the mechanism adjusted differently.
Figure 16:
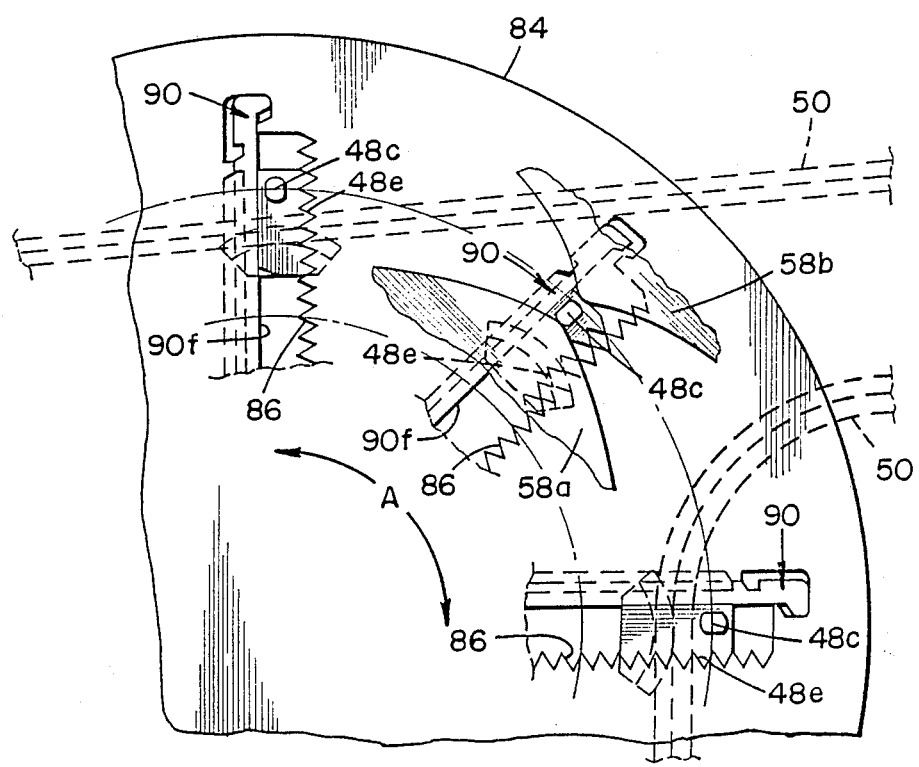
FIG. 16 is a greatly enlarged diagrammatic detail of parts seen at the plane 16—16 of FIG. 7.

In adjustment zone A, nubbins 48c of the sheave segment are carried by rotating sheave 44 into the space between the cams 58a and 58b of gate 58 (FIGS. 12, 14B and 16). It is assumed in relation to FIG. 14A that gate 58 is in a fixed position during repeated rotations of sheave 44. So long as the transmission ratio remains constant, there is no tendency of gate 58 to readjust the sheave segment.

The apexes of teeth 86 of all the slots in the discs are distributed along circles represented by the broken-line arcs in FIG. 16. These teeth establish discrete positions of adjustment of sheave segments 48. The mechanism which adjusts gate 58 (described below) is operated in steps that correspond to teeth 86, so that gate 58 in its discrete adjustments tracks with each sheave segment 48 in each of its discrete adjusted positions. There is a limited amount of looseness of teeth 48e in the adjustment zone A (FIG. 16). Rails 90 maintain the full meshed condition of teeth 48e and teeth 86 outside adjustment zone A, to withstand the forces applied by belt 50 to each sheave segment.

Nubbins 48c of the sheave segments 48 are repeatedly carried through the space between the cams of gate 58 as sheave 44 continues to rotate. So long as the gate adjustment is constant, ideally there is no gate-to-nubbins contact so that noise due to such contact and wear of the nubbins and the gate cams are avoided under ideal conditions. In practice, the dimensions and the relationships of the parts deviate somewhat from the ideal. However, the space between the gate cams is made a bit larger than the nubbins 48c, and each sheave segment is somewhat loose as it is carried through the adjustment zone, so that noise and wear are minimal.

FIG. 14B is a view like FIG. 14A except that gate 58, more particularly gate cam 58a, is represented in an adjustment such that, as sheave 44 turns, nubbin 48c engages and is pushed outward (away from the hub of sheave 44) by cam 58a. The effect is to force the set of teeth 48e of sheave segment 48 to ratchet into mesh with a different group of teeth 86. In this example, sheave segment 48 is forcibly shifted one or two tooth-lengths from a previous setting when passing through gate 58 in any one revolution of the sheave. As teeth 48e are forced along teeth 86, the slant sides of teeth 48e initially slide along slant sides of teeth 86, causing sheave segment 48 to drive teeth 90a of the locking rails into deeper mesh with teeth 88. The ramps of those cooperating teeth 88 and 90d force rails 90 to shift a little closer to the sheave's hub, downward and to the left in FIG. 14B. This same shift of locking rails 90 toward the sheave's hub occurs both when gate cam 58a forces sheave segment 48 to shift outward (away from the sheave's hub) and when gate cam 58b forces sheave segment 48 to ratchet inward (toward the sheave's hub). As the paired rails 90 shift inward, cam follower 94c is shifted slightly away from cam segment 96d and against spring 95, discussed further below.

Figure 15:
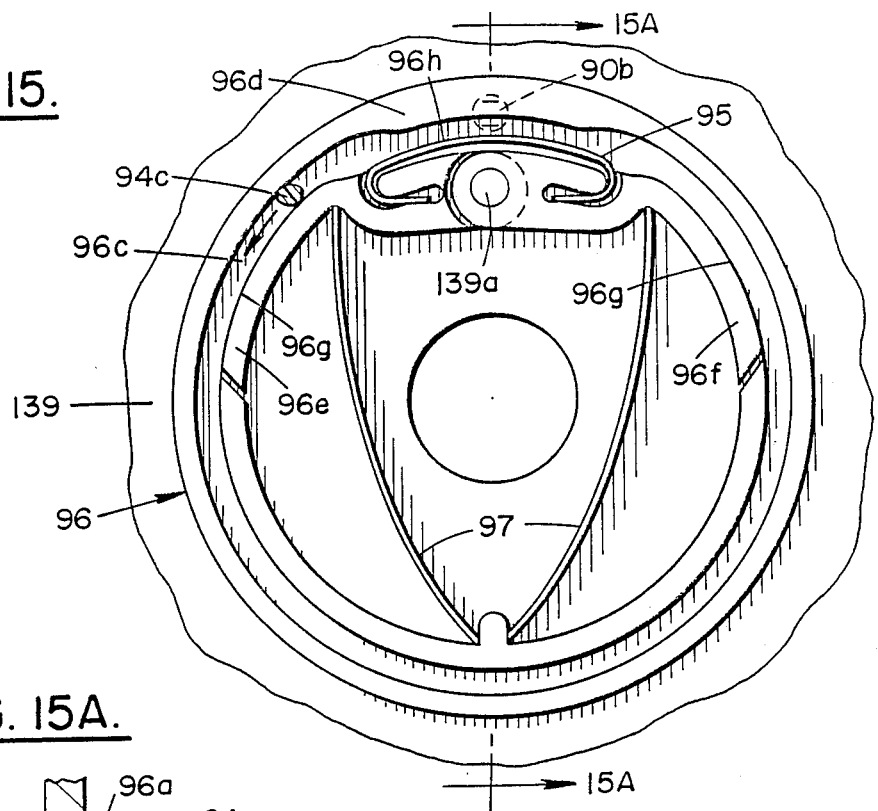
FIGS. 15 and 15B are greatly enlarged views of parts seen at the plane 15—15 in FIG. 7, showing the parts in different conditions.
Figure 15A:
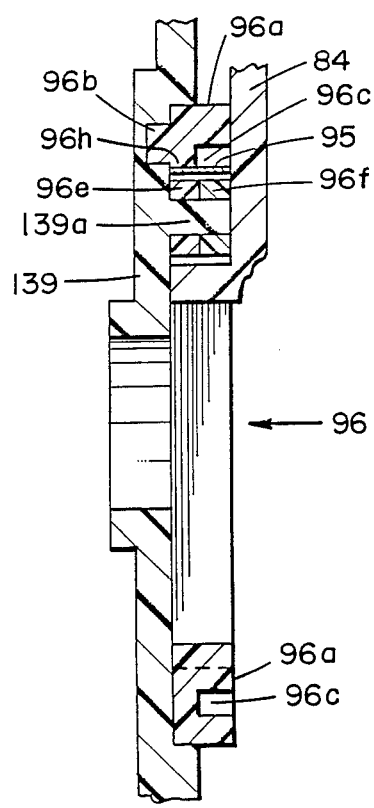
FIG. 15A is a fragmentary cross-section of FIG. 15 at the plane 15A—15A.
Figure 15B:
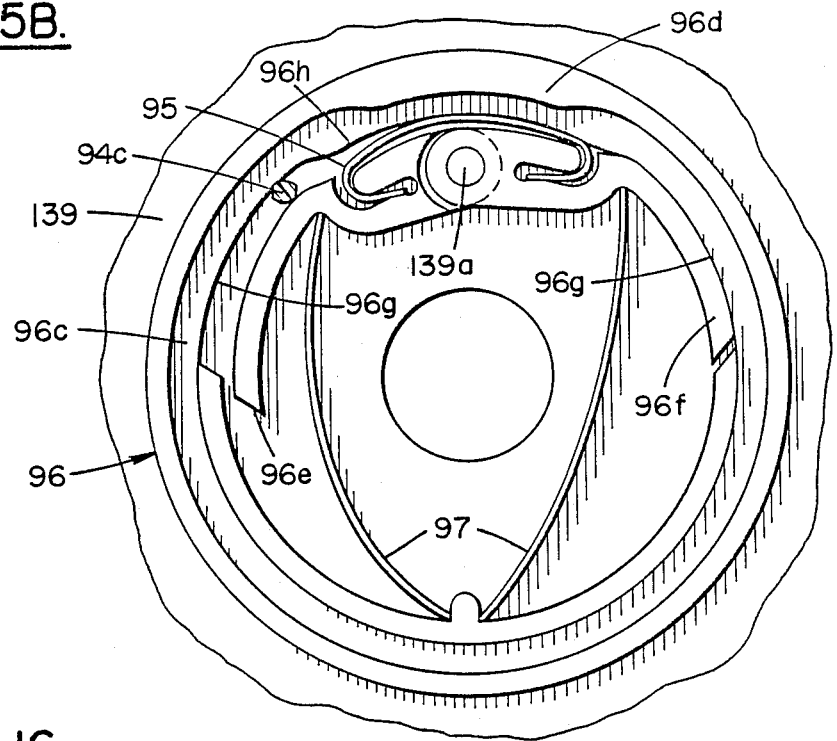

In FIGS. 7, 13, 15, 15A, and 15B, cam assembly 96 includes a main generally annular body 96a that is set into a circular recess in wall 139 at the right side of the transmission's casinq (at the left in FIG. 7). Integral projection 96b fits in a mating recess in wall 139 for accurately locating the cam assembly in wall 139. Body 96a of the cam assembly provides most of the radially inner and outer walls of a generally circular cam track 96c. One cam follower 94c is shown in FIGS. 15 and 15B, but a cam follower 94c of each of the flippers 94 moves along cam track 96c as sheave 44 rotates. Most of cam track 96c is truly circular, but cam segment 96d (being part of the outer wall of track 96c in the adjustment zone A) is off-set toward the sheave's axis. Cam segment 96d causes flippers 94 to pivot toward the sheave's axis; each flipper 94 is tilted downward in FIG. 14A as it traverses adjustment zone A. This cam portion 96d actuates flippers 94 to shift successive pairs of locking rails 90 for shifting successive sheave segments 48 to their released condition as they enter zone A, preparing the sheave segments for adjustment by gate 58.

About half of the inner wall of cam track 96c is integral with body 96a. The upper half of the inside wall of cam track 96c as shown in FIG. 15 is a composite of three movable parts. Two wings 96e and 96f are pivoted on stud 139a which is an integral portion of wall 139 (FIGS. 7, 13, 15, 15A and 15B).

Wings 96e and 96f are wider than the depth of channel 96c, so that part of each wing's width serves as a segment of the inner wall of track 96c and part of each wing (e.g. wing 96f in FIGS. 13 and 15) bears against a respective stop surface 96g of cam body 96a (FIGS. 15 and 15B). Leaf spring 97 provide relatively stiff spring pressure against wings 96e and 96f, holding them forcefully against stop surfaces 96g so that the wings in their position shown in FIG. 15 serve as ordinary portions of the inner wall of track 96c.

Bowed leaf spring 95, having its ends movably captive in recesses in wings 96e and 96f, acts generally as a resilient continuation of the inner wall of track 96c opposite cam segment 96d of the cam track, between wings 96e and 96f. As seen in FIG. 15A, most of the leaf spring 95 forms a segment of the inner wall of cam track 96c. The remainder of the spring's width bears against a curved portion 96h of body 96a for determining the position and part of the contour of the leaf spring opposite to cam segment 96d.

The cam follower 94c of one of the flippers 94 is shown in FIG. 15 in a typical position that corresponds to the condition of the parts represented in FIG. 14. As wheel 18 rotates, each cam follower travels along cam track 96c in the direction of the arrow. When it reaches portion 96d of the cam track, cam follower 94c drives the flipper down as seen in FIG. 14A and unlocks sheave segment 48.

If the gate 58 is shifted for changing the transmission's ratio, the gate cam 58a or 58b deflects nubbin 48c of a released sheave segment 48. The resulting forcible shift of sheave segment 48 causes cooperating teeth 48e/86 and 88/90a to shift paired locking rails 90 and flipper 94 generally toward the sheave's axis. Earlier, segment 96d of the cam track 96c shifted parts 94 and 90 to unlock the sheave segment (FIG. 14A), leaving the sheave segment detented in its previous adjustment. As sheave segment 48 is being forced out of that adjustment by gate 58 (FIG. 14B), the downward shift of parts 90 and 94 is increased. Cam follower 94c is spaced from cam segment 96d and the cam follower bears against spring 95.

As sheave 44 continues to turn (FIG. 14B), the apexes of teeth 48e of the sheave segment in the adjustment zone are forced past apexes of teeth 86 until the intended new relationship of teeth 48e and teeth 86 is reached. At some moment, nubbins 48c pass the cusps of the gate cams. When sheave 44 rotates very fast, nubbins 48c move quickly to widely spaced portions of the gate cams 58a and 58b. The sheave segment might ratchet loosely beyond the intended setting. Such action is precluded by bias of spring 95 acting via flipper 94, locking rails 90 and the ramps of cooperating teeth 88 and 90a to establish the detented state of FIG. 14A instantly after nubbins 48c pass the cusps of the gate cams.

The moments when nubbins 48c pass gate 58 are completely random in relation to the timing of the mechanism that adjusts gate 58 for establishing each new transmission ratio. Accordingly, at the moment when nubbins 48c are passing the cusps of the gate cams, gate 58 may have moved only partway from a previous setting corresponding to one of the broken-line arcs in FIG. 16 to a new discrete setting corresponding to another arc.

Figure 14C:
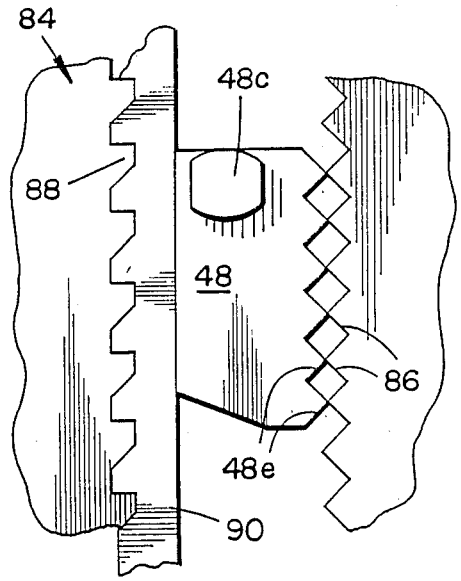

Under such conditions, there is a remote possibility that teeth 43e (locking formation) of a sheave segment might be left apex-to-apex in relation to teeth 86 (locking formation) (FIG. 14c) as nubbins 48c leave the cusps of the gate cams. Each flipper reaching the end of the adjustment zone A should be driven to the position represented in FIG. 14 by the (radially) inner wall of cam track 96c, to lock teeth 48e in meshed relationship to teeth 86. However, if teeth 48e and teeth 86 are apex-to-apex at the instant when flipper 94 should be driven upward from its position shown in FIG. 14B, an ordinary positive-acting cam would cause crushing of some of the parts. The releasable portion 82 resilient segment of the cam's inner wall represented by wing 96e and its spring 97 precludes such damage. When cam follower 94c moves in the direction of the arrow in FIG. 15B during moments when the apex-to-apex condition of FIG. 14C exists, wing 96e is forced to pivot against the strong pressure of spring 97. As sheave segment 48 reaches the end of adjustment zone A, belt 50 starts to bear against the sheave segment. If the apex-to-apex condition were to be in effect at that instant, pressure of the belt would shift sheave segment 48, ending the apex-to-apex condition. Spring 97 would instantly drive wing 96e outward to its stop surface 96g. Flipper 94 and locking rails 90 move to establish the condition of FIG. 14, enabling sheave segment 48 to withstand the belt pressure. Any slight error in the adjustment of one or more sheave segments 48 that might arise due to the special condition just described is of little consequence; and even that small error is corrected in subsequent rotations of sheave 44.

The condition that has just been described can also occur when the transmission is being operated in reverse, as when the bicycle is being back-pedalled (without driving the back wheel) for changing the transmission ratio. Providing wing 96f and its spring 97 serves in precluding the crushing of parts as described above.

Gate 58 consists of two mirror-image units (FIG. 17) each of which is, for example, a molded plastic part. Each such unit includes a pair of gate cams 58a and 58b and a yoke 58d, unified by rail 58c. Rail 58c of one of these units slides in groove 39b in left-side wall 39 of the casing. Cams 58a and 58b and yoke 58d of this unit are confined between wall 39 and disc 82. The rail of the mirror-image part slides against disc 84 and in a groove (not shown) that is formed in the opposite wall 139 of the casing, parallel to grooVe 39b. The pairs of gate cams cooperate with opposite nubbins 48c (FIG. 13) of each of the sheave segments 84.

Idler or idler roller 62 (FIGS. 5, 5A, 6, 11 and 17) is carried by idler support member 98. Idler 62 has a shaft 62a (FIG. 11) fixed to cupped discs that are spaced apart. Idler 62 is supported by a bearing 98a (FIGS. 11 and 17) that reaches shaft 62a via the space between the two discs. Member 98 is (for example) a one-piece element formed of molded plastic, including spaced-apart rectangular plates 98b. The edges of plates 98b are parallel to each other, and projections 98c are opposite each other on the faces of plates 98b, and member 98 has a further projection 98d. One plate 98b slides in a groove 39c in casing wall 39, and the other plate 98b slides in an opposite groove (not shown) parallel to groove 39c in wall 139.

Part 52b of the coordinating mechanism shown in FIG. 5A is adjustable horizontally along arrow 100 in FIG. 12 between slide guides 41a in section 41 of the casing wall. Part 52b includes a yoke 52c (FIGS. 11, 12 and 17) that embraces projection 98d of member 98. Idler support 98 is movable along the path of arrow 102, at an angle to arrow 100. Slide portion 58c of one unitary part of gate 58 moves in groove 39b of casing wall 39 and, correspondingly, the slide portion 58c of the companion gate part (FIG. 17) moves in a groove (not shown) parallel to groove 39b in casing wall 139. The two mirror-image parts of gate 58 are moved in unison by unitary projections 98c of the idler roller support 98 so that gate 58 moves along a path represented by arroW 104 in FIGS. 12 and 17.

When ratio adjustment part 52b is shifted from right to left, from one extreme position (FIG. 5) to the opposite extreme (FIGS. 6 and 12), projection 98d is forced to the left but with a downward component as a result of the different slide paths represented by arrows 100 and 102. (In FIG. 11, the adjustment of the parts is nearly the same as in FIG. 5). The same leftward shift of ratio adjustment part 52b moves composite gate 58 along the path of arrow 104, at an angle to the path 102 of idler support 98. This right-to-left shift of adjustment part 52b occurs progressively. It has the effect of positioning gate 58 so as to move sheave segments 48 to progressively smaller radii during ensuing rotations of sheave 44. The ends of gate cams 58a and 58b diverge sufficiently from their point of least separation so that nubbins 48c can enter the gate and can be shifted through several steps of adjustment of part 52a.

Figure 17:
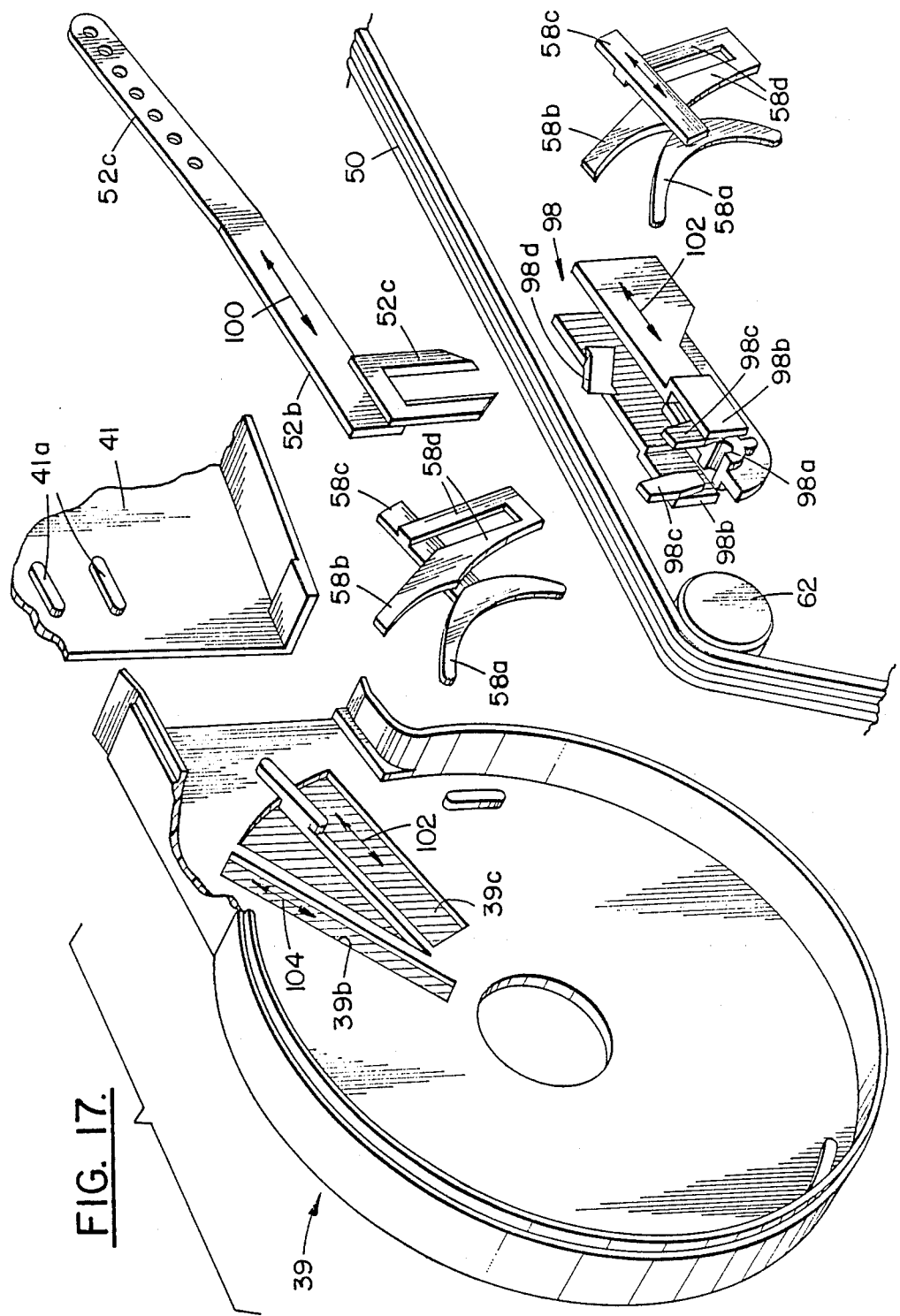
FIG. 17 is an exploded perspective of a portion of the transmission, generally as seen from the front and left of FIG. 12.

Reverting now to FIG. 14B, projection 98c is presumed to be moving stepwise to increase the common radius of sheave segments 48. In FIG. 14B, gate cam 58a is to displace nubbin 48c upward as sheave 44 turns clockwise. Parts 98c of the idler support 98 are slidably confined in yokes 58d (FIG. 17). Sheave 44 has turned and carried a nubbin 48c into contact with gate cam 58a, so that the sheave segment 48 in FIG. 14B is to be adjusted radially outward. Paired locking rails 90 have released sheave segment 48 earlier so that the sheave segment can be shifted by the gate, like the condition of sheave segment 48 that prevails in FIG. 14A.

When cam segment 96d acts to shift flipper 94 so as to shift teeth 88 and 90a out of their locking condition shown in FIG. 14, some looseness of sheave segment 48 develops (FIG. 14A). That looseness is limited by engagement of cam follower 94c with spring 95; teeth 48e are not allowed to become fully clear of teeth 86. Sheave segment 48 thus remains detented in its preVious adjustment.

As turning of sheave 44 continues and sheave segment 48 is carried with it, and as nubbins 48c engage cam 58a, driving sheave segment 48 outward along teeth 86, the slant surfaces of teeth 48e are forced to slide along slant surfaces of teeth 86. This cooperation of teeth 48e with teeth 86 drives the paired locking rails 90 engaged by sheave segment 48 to the left and downward in FIG. 14B. Teeth 90a are driven more fully in mesh with teeth 88. Downward movement of rails 90 shifts cam follower 94c of flipper 94 slightly away from cam segment 96d and against spring 95. As the apexes of teeth 48e ratchet past the apexes of teeth, spring 95 drives elements 94, 90 and 48 in the directions that maintain teeth 48e in mesh with teeth 86. Finally, the inner wall of cam track 96c restores flipper 94 to its raised condition, so that rails 90 and sheave segment 48 are restored to their locked conditions as shown in FIG. 14.

When ratio adjustment part 52b has been adjusted for establishing a new radial position for sheave segment 48 that is closer to the sheave's axis, gate cam 58b is in the path of the nubbins 48a. However, essentially the same interaction of parts 48, 90, 94 and 95 occurs as described above.

The foregoing discussion relates directly to the adjustment of the rear sheave 44, its gate 58, and its idler 62 under control of adjustment part 52b. Part 52a has the same effect on the gate and the idler of the front sheave 42, differing in details noted below.

As seen in FIGS. 5A, 20, 21 and 22, parts 52a and 52b are joined to each other by a pin 52d extending integrally from part 52a into one of the holes 52e chosen for adapting the transmission to the dimensions of the chosen bicycle frame. Pin 52d is received in a groove 40a in wall 40 of the casing at the bicycle rider's left. Wall 40 is part of the casing that encloses the front end of the transmission 30.

Figure 18:
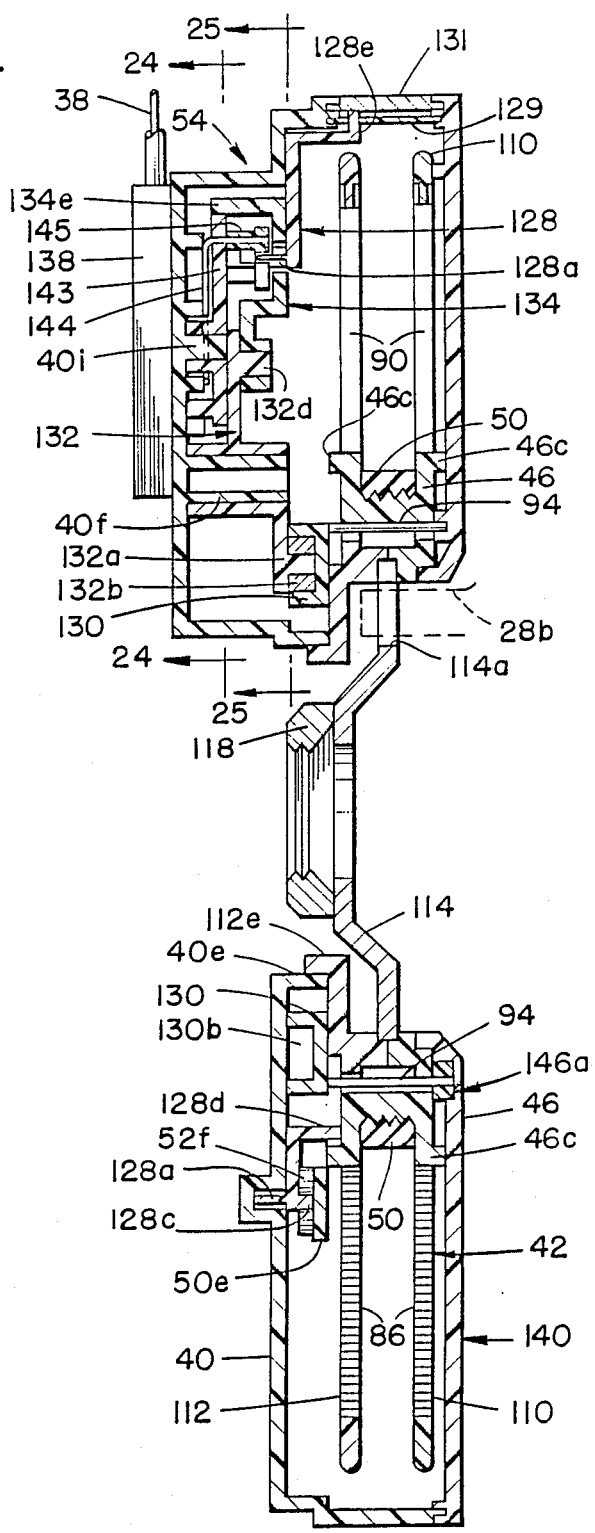
FIG. 18 is a cross-section of the pedal-driven portion of the transmission, generally as seen at the plane 18—18 in FIG. 5, the plane of the cross-section being distorted at the left-hand portion of this view to illustrate the parts' relationship more effectively.

FIG. 18, showing the front end of the transmission is a cross-section generally in a plane containing the axis of sheave 42. This Figure does not represent a one-plane cross-section; rather, it represents a composite cross-section in various planes chosen for greatest effect in showing the relationships between various components of the mechanism. The true relationships of the parts appears in many other views.

The transmission casing includes left-side and right-side walls 40 and 140, i.e. at bicycle rider's left and right. These walls enclose the pedal-driven sheave 42 and the adjusting mechanism includes its pedal-powered mechanism 54 (FIG. 2) that responds to the manual control of FIGS. 3 and 4 for adjusting the entire coordinated ratio-determining mechanism of FIGS. 5A.

Sheave 42 comprises two discs 110 and 112 which, like discs 82 and 84, have aligned radial slots. The sheave segments 46 are locked in adjusted positions along the slots by meshed teeth and locking rails 90, all of which is of the same configuration as is shown in FIGS. 7 and 11–17 and described above in connection with the adjustable sheave segments 48 of the rear sheave 44. Sheave segments 46 have nubbins 46c (the same as nubbins 48c) that project outward in relation to opposite sides of discs 110 and 112 (FIG. 18) for cooperation with gate 56 (FIG.. 5A). Sheave 42 has the same flippers 94 as the flippers of sheave 44. A cam like cam assembly 96 for controlling flippers 94 of sheave 4 is detailed below.

Figure 19:
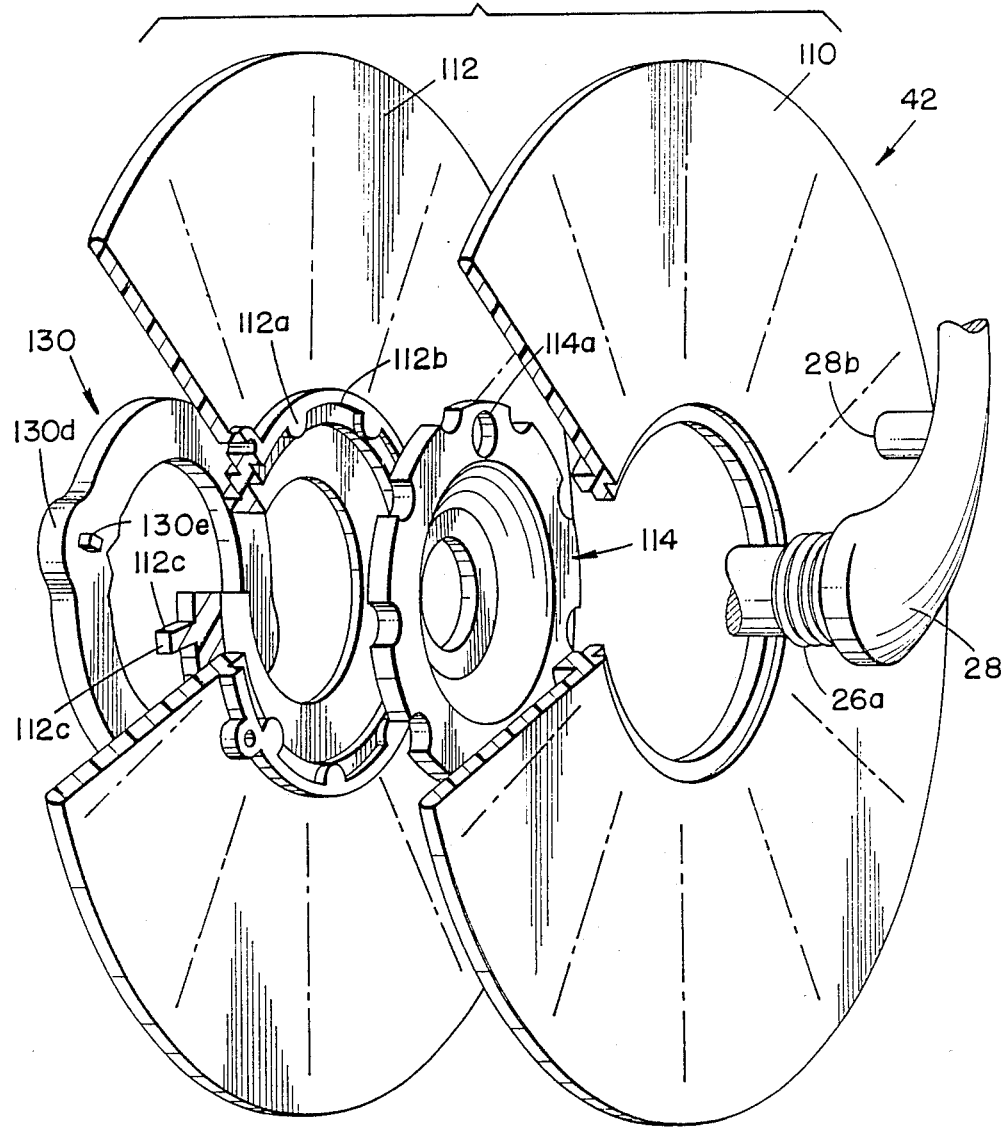
FIG. 19 is a somewhat diagrammatic exploded perspective of certain components shown in FIG. 18, as seen from the right-side and the rear of the transmission.

FIG. 19 shows discs 110 and 112 diagrammatically, including slots represented by dot-dash lines for the sheave segments. The rim of a drive disc 114 is sandwiched between hub portions of these discs. Projections 112a and recesses 112b at the hub portion of disc 112 mate with complementary shapes (as shown) at the rim of disc 114, and disc 110 similarly has projections and recesses that mate with the complementary rim of disc 114 (FIGS. 18 and 19). Disc 114 is clamped to pedal crank 28 by threads 26a and nut 118 (FIG. 18). Drive pin 28b projecting from the pedal crank fits in hole 114a in disc 114. Discs 110 and 112 are united to each other by details not shown. (Two-lobed cam 130 in FIG. 19 is discussed below in detail).

The sheave segments 46 of sheave 42 (FIG. 18) are adjusted by the ratio-adjusting mechanism 54, more particularly by part 52a (FIGS. 20–22) that adjusts gate 56. This gate (FIG. 22) includes two unitary mirror-image components that face each other. Each of these components includes a pair of gate cams 56a and 56b and a rail 56c and a diamond-shaped projection 56d. Cams 56a and 56b and diamond-shaped projection 56 of one part of gate 56 operates in the space between wall 40 and disc 112. Cams 56a and 56b and the diamond-shaped projection 56d of the other part of gate 56 operate in the space between wall 140 and disc 110. One rail 56c slides in a groove 40c along a radius of sheave 42; rail 56c of the other gate part slides along a parallel groove (not shown) in the opposite wall 140.

Gate cams 56a and 56b of the two parts of gate 56 are identical. Each pair of gate cams 56a and 56b has widely spaced-apart extremities and closely spaced cusps midway between the extremities, being thus shaped and proportioned like gate cams 58a and 58b of the rear sheave. The cusps of cams 56a and 56b of gate 56 are spaced apart a little more than necessary to allow nubbins 42c to pass between them, to act in the same manner in relation to sheave segments 46 as is described above for gate 58 in relation to sheave segments 48.

Ratio adjustment or control part 52a is a single molded plastic component in this example. It includes curved portion 52e with cam-followers 52f and rib 52n at one end; a projecting rib 52g; a slot 52h; integral projections 52i, 52j and 52k; and a hooked extension 52m. Projection 52d (see above) and rib 52g and rod 52n slide in grooves 40a, 40b and 40m, respectively, in wall 40 of the casing, so that part 52a is adjustable along a straight-line path that is almost horizontal. Slot 52h in part 52a embraces diamond-shaped projection 56d of gate 56 and serves as a yoke to drive one part of gate 56 radially along groove 40c as part of 52a is adjusted to different ratio-determining positions. (The purposes of portions 52f and 52i–52m appear below.)

The portion of part 52a in which slot 52h is formed is confined between left-side wall 40 of the casing and left-side disc 112 of sheave 42. A part 122 (FIG. 22) is confined in a space between right-side wall 140 of the casing (FIG. 18) and right-side disc 110. Part 122 is joined to part 52a by integral projections 52i, 52j and 52k that abut and are united to corresponding integral projections 122i, 122j and 122k of part 122. Part 122 is here made as a one-piece plastic component. Slot 122h in part 122 is identical and parallel to slot 52h in part 52a. The slots 52h and 122h in parts 52a and 122 constitute yokes that cooperate with diamond-shaped projections 56d and are coordinated to operate the parts of gate 56 in unison along a radius of sheave 42 in the sheave-segment adjusting zone, i.e., in the zone where belt 50 does not bear against any sheave segment. The mirror-image parts of gate 56 cooperate with the pair of nubbins 46c of each sheave segment 46. Nubbins 46c project oppositely from discs 110 and 112 (FIG. 18).

Idler roller 60 is shifted to various adjustments in coordination with the adjustment of gate 56 by the coordinating mechanism shown in FIG. 5A. More specifically (see FIG. 22), idler support 124 comprises one arm 124a having a bearing 124b for an internal shaft (not shown) of idler roller 60. Idler support 124 has another arm 124c, here in the form of the two parallel portions as shown. Arms 124a and 124c extend in opposite directions from a pivot bearing 124d that turns on a pivot formed by unified projections 52j and 122j. A pair of wire springs 126a and 126b apply bias to idler support 124 for resiliently lifting idler 60. These springs bear against spring-retaining recesses 52m and 122m in parts 52a and 122 and, at their opposite ends, these springs bear against spring-retaining recesses in dual arm 124c of the idler support. As parts 52a and 122 move gate 56 to its various adjusted positions, the same parts move idler roller 60 to various adjusted positions. In addition to such adjustments of idler roller 60 in coordination with the adjustment of gate 56, idler roller 60 is resiliently movable by its pivoted support 124 to provide sufficient tension on belt 30 to place the drive in its forward drive rotation (assisted by generous belt wrap around) as well as in its reverse rotation ratio-changing mode.

One consideration in the design of the present transmission is reducing or eliminating slippage between the belt and sheave segments. The movement, support and placement of idler members 60 and 62 in the transmission disclosed herein is of great importance in reaching this end. When force is applied to pedal crank 28 it will rotate sheave 42 along with sheave segments 46. Sheave segments 46, as they rotate, will place a force on belt 50 which transmits motion to sheave 44 through its segments 48. The amount of force that can be applied to the pedal crank without slippage of the belt relative to segments 46 can be expressed as a function of the tension forces applied to the belt on the "tight" and "slack" sides of sheave 42 by the pedal crank in accordance with the following formula:

$$T_2/T_1 = e^{fB}$$

wherein $T_2$ is the tension on the "tight" side of the belt (the upper belt run in FIG. 6 with forward pedalling); $T_1$ is the tension on the "slack" side of the belt (the lower belt in FIG. 6 with forward pedalling); e is the natural logarithm to the base e (log $T_2/T_1$); f is the coefficient at friction between the belt and sheave segments; and B is the total angle (in radians) of belt contact (or wrap) around the sheave segments. As can be seen from the above formula, the ratio of $T_2/T_1$ depends on the extent of belt wrap in a given system, and, further, since belt wrap B is an exponential factor in the formula and multiplied by the coefficient of friction f, small incremental increases in the extent of belt wrap will generate exceedingly large increases in the amount of force that can be placed on the pedal crank before slippage or impending slippage occurs.

It can be appreciated, in the environment of the transmission disclosed herein, that a sufficient degree of belt wrap to reduce undesirable slippage has to be accomplished in a very small space adjacent the periphery of the sheaves, a space that also contains several other elements of the overall system. Further, the positions of the idler members have to accommodate many ratios, such as 21 discrete ratios in the transmission described. To accomplish this, idler members 60 and 62 are independently supported for movement to obtain the degree of wrap desired. The structure provided herein for supporting and moving idler members 60 and 62 enables the belt to have a larger amount of contact or wrap with the sheave segments 46 and 48 than the prior art for all selected ratios. It does so while still providing sufficient room for the other parts of the mechanism.

In my previous transmissions, such as disclosed in U.S. Pat. Nos. 4,030,373 and 4,530,676, the degree of wrap between the belt sheave segments was not as great as disclosed herein. For instance, in the '373 patent, one of the idlers was fixed and the other was spring loaded to allow it to pivot toward and away from its associated mounting plate. This arrangement does not allow the same amount of wrap as the present system. In my '676 patent, both idlers were supported by resilient arms which swing around the axis of the same pivot pin. This provided a resilient wishbone configuration for the belt guide rollers, the arms of which could flex for yielding slightly toward and away from each other to allow the rollers to accommodate the changing belt geometries. The amount of wrap disclosed in this patent also is not as great as is possible in the present system.

The present transmission, through the use of idler members which are independently supported for movement, provides a greater amount of wrap than the prior art devices. Because of the exponential relationship between amount of wrap and slippage of the belt in the sheave segments, this relatively small increase in wrap permits very large increases in traction and power without slippage occurring. In addition, little or virtually no tension need be kept on the belt during the time the transmission is not in use. This advantageously reduces wear and tear on the belt and on the sheave bearings.

Recapitulating briefly, the coordinating adjustment mechanism of FIG. 5A serves to establish various ratios of the diameters of sheaves 42 and 44 by adjusting gate 56 and gate 58. The radius of one of the sheaves increases as the radius of the other is decreased and the positions of idler rollers 60 and 62 are coordinately adjusted for each new ratio of the sheaves 42 and 44.

The position of member 52 (comprising parts 52a and 52b) is adjusted by the mechanism 54. Force for operating mechanism 54 is derived from the pedal; the ratio-determining position of member 52 is changed (when desired) in response to the slight finger effort of the bicycle rider applied to control 32.

FIGS. 18-29 show the details of mechanism 54. In this mechanism, cam member 128 has a body portion 128b that bears against left-side wall 40 of the enclosure. Circular rib 128a of member 128 slides along groove 40d in side wall 40 of the casing (FIGS. 18 and 20-24). This groove and the rib are centered at the axis of sheave 42, i.e., the pedal axis. Rib 128a has a series of ratchet teeth 128g (FIGS. 25 and 28) along its inner and outer curved surfaces. Whereas circular rib 128a projects from flat body portion 128b toward left-side casing wall 40, a stepped cam 128c forms an integral portion of member 128 that projects oppositely, to the right from flat body portion 128b. Stepped cam 128c has a series of dwells and sloping transitions, the dwells being located at progressively different distances from the common axis of sheave 42 and the pedal. A series of three projections 128d also extend to the right from flat body portion 128b. Projections 128d are at a common radius from the axis of sheave 42 and they bear against wall 40 and against disc 112 (FIG. 18) at a smaller radius than the innermost radial setting of the nubbins of sheave segments 46. Stepped cam member 128 is adjustable along groove 40d about the common axis of sheave 42 and the pedal crank.

Posts 52f project integrally from part 52a and these posts bear against opposite sides of stepped cam 128c. Post 52f are movable along an essentially horizontal path, since projection 52n of part 52a is guided in groove 40m.

Figure 20:
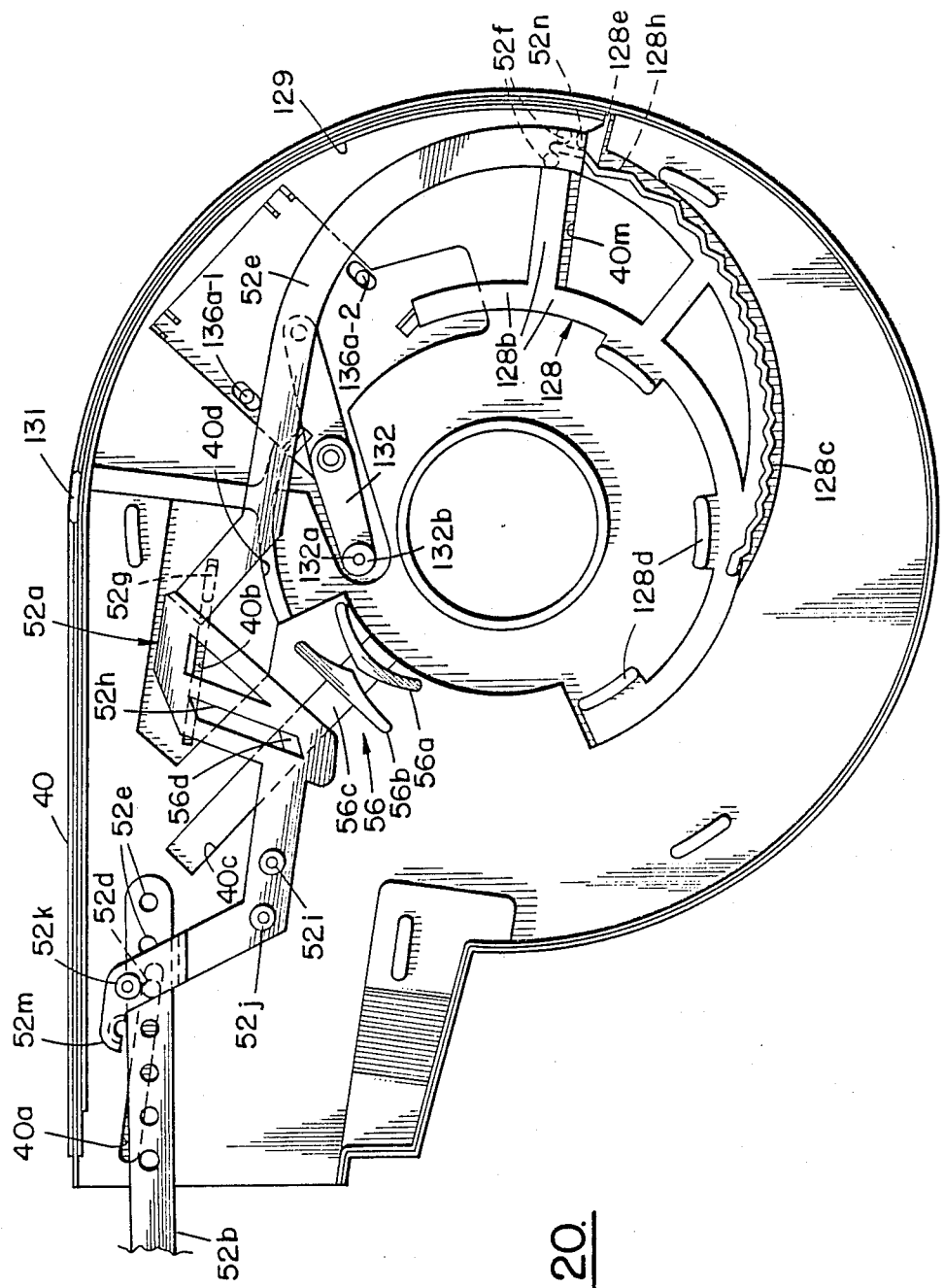
FIG. 20 is a right-side elevation of the pedal-driven portion of the transmission, showing adjustment components corresponding to the adjustment represented in FIG. 5.
Figure 21:
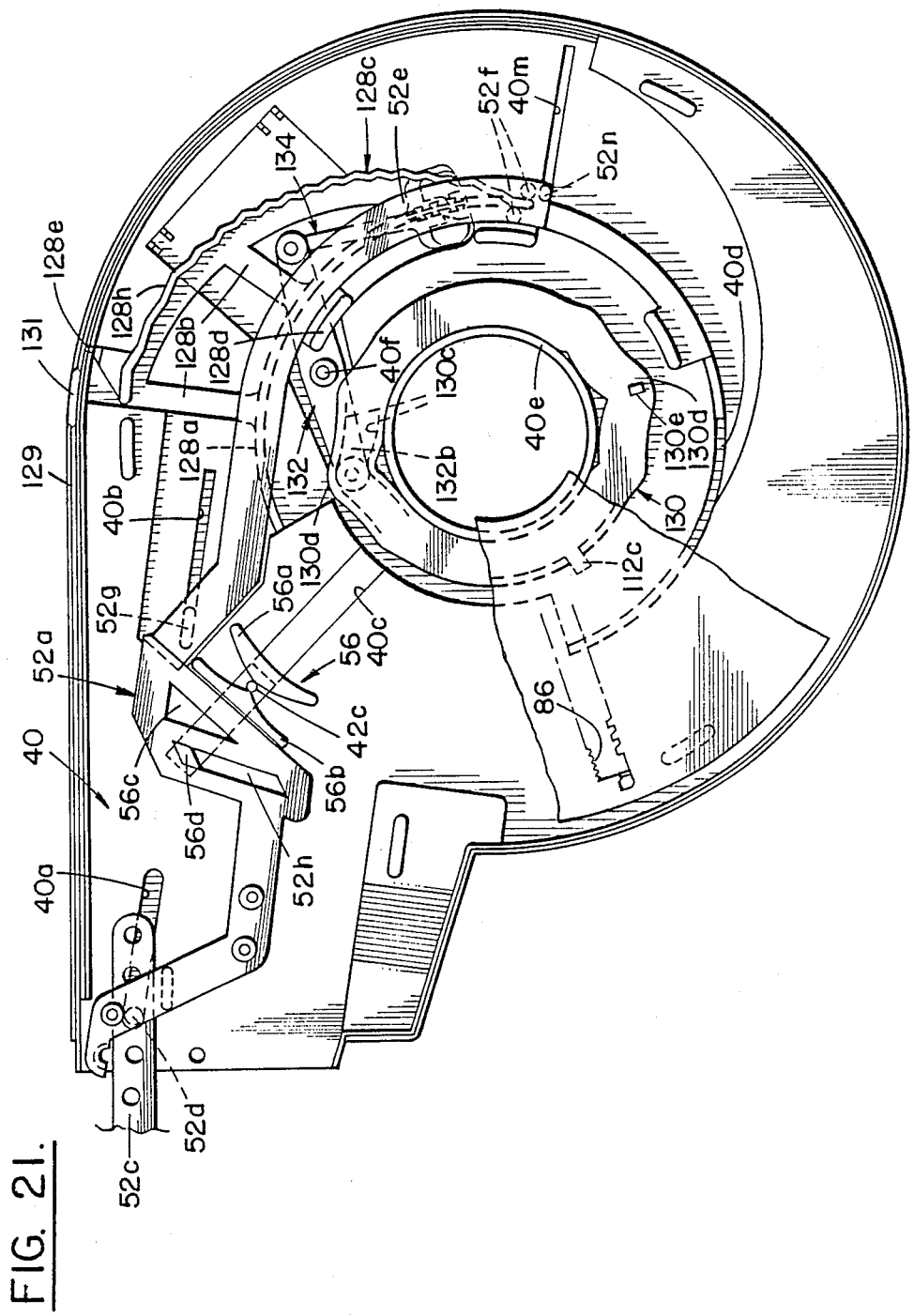
FIG. 21 is a view like FIG. 20 showing adjustment components corresponding to the adjustment represented in FIG. 6.

A mechanism (described below) is effective to index member 128 about the pedal axis from each dwell to the next between the extreme positions represented in FIGS. 20 and 21. As this occurs, the successive dwells of cam 128c at different radii from the pedal axis are moved into cooperation with posts 52f. The steep transitions of cam 128c cause gates 56 and 58 to shift abruptly to discrete positions that are determined by the dwells. Those dwells precisely determine the discrete positions of gates 56 and 58 and those dwells correspond to the distribution of the concentric circles of teeth on each of the sheaves and to the discrete positions of sheave segments 46 and 48. In a practical example, stepped cam 128c provides twenty-one (21) discrete dwells that determine the adjustment of part 52, corresponding to the same number of discrete radial settings of sheave segments 46 and sheave segments 48.

Figure 22:
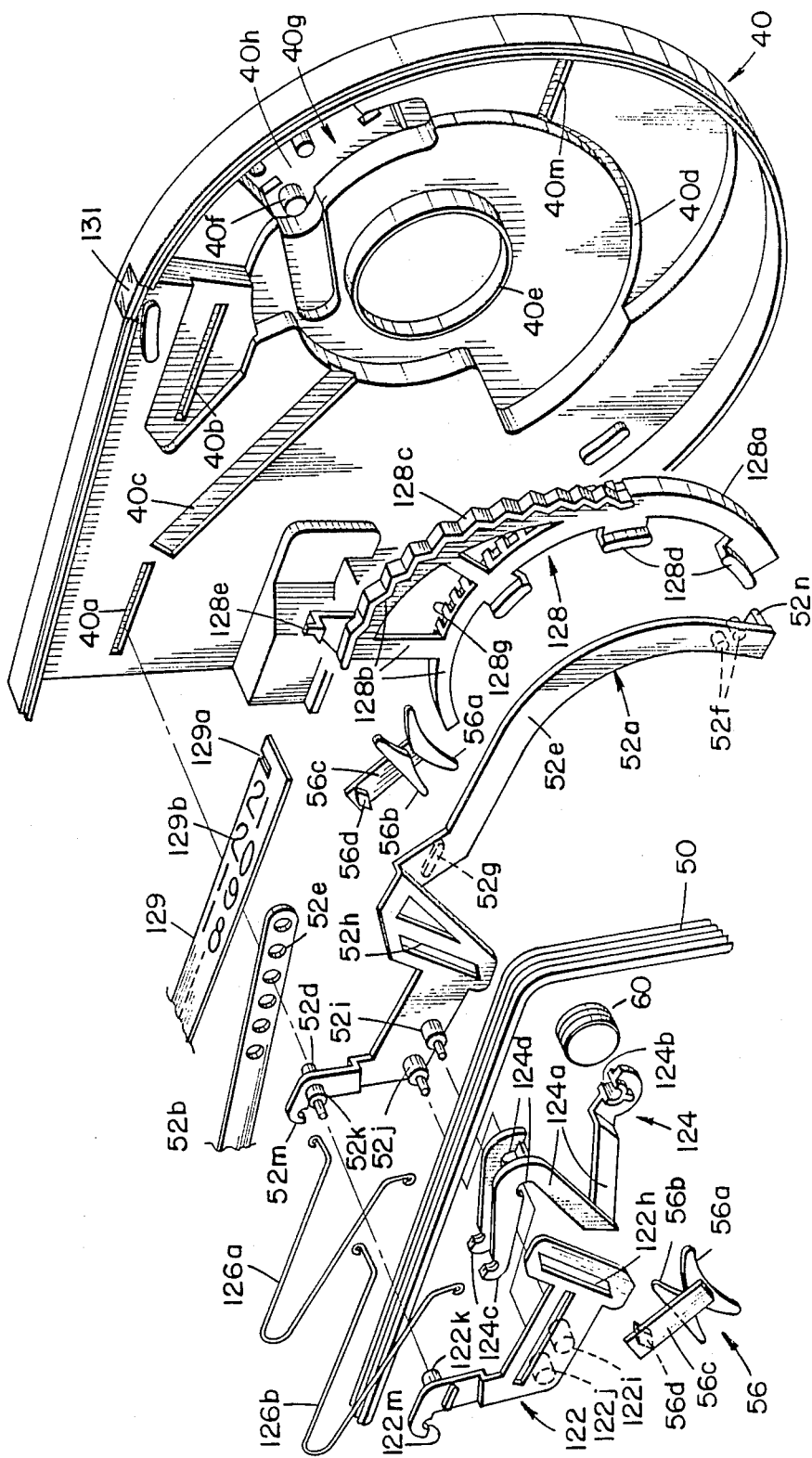
FIG. 22 is an exploded perspective primarily showing adjustment parts as seen from the front and to the right of the transmission in FIG. 5.

Part 128 has a projection 128e that extends radially outward. That projection 128e fits into an openinq 129a of indicator strip 129 (FIG. 22). As shown in FIG. 18, indicator strip 129 slides in aligned grooves in the opposite walls 40 and 140 of the casing. Strip 129 passes a clear window 131 where one large ratio-identifying number 129b at a time is displayed. Window 131 is located at a point that may be viewed easily by the bicycle rider, at the top and near the front end of the transmission casing (FIGS. 2 and 22). The number "1" is at window 131 when the transmission is adjusted to its lowest-speed ratio as represented in FIGS. 6 and 21, and number "21" is set at the window for the highest-speed ratio represented in FIGS. 5 and 20.

Figure 4:
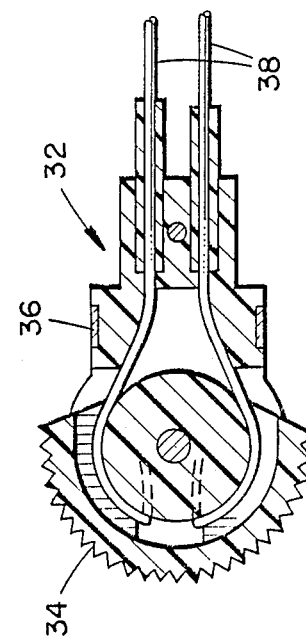
FIG. 4 is a cross-section of the finger control of FIG. 3 as seen at the plane 4—4 in FIG. 3.
Figure 3:
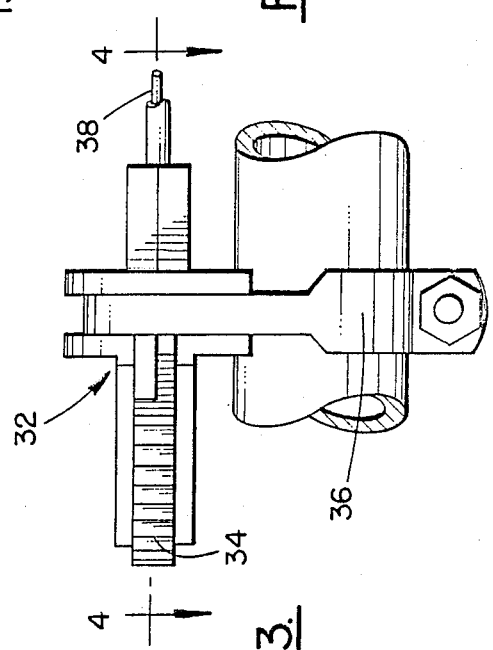
FIG. 3 is a side elevation of a finger control shown in FIGS. 1 and 2, FIG. 3 being greatly enlarged as compared to FIGS. 1 and 2.

Mechanism 54 causes stepped cam member 128 to operate from any one setting to another in response to the cords 38 and the manual control of FIGS. 3 and 4. In the following discussion, it should be remembered that FIG. 18 does not involve a simple cross-sectional plane; instead, the cross-sectioned plane of many of the components is varied in FIG. 18 as a drafting expedient for showing relationships among the parts most effectively. FIGS. 19-24 represent the true relationships of the parts shown in FIG. 18.

A double-lobe cam 130 (FIGS. 18, 19, 21 and 23) is confined between left-side wall 40 of the casing and disc 112 of sheave 42. This cam is rotatable about the sheave's axis. The inner circular portions of this cam are guided by a collar or ring 40e that projects as an integral portion of casing wall 40 (FIGS. 18 and 21). Cam 130 has a channel 130b that opens toward left-side wall 40; the walls 130c of the cam which define that channel are concentric with ring 40e most of the way around the axis. However, cam 130 has outward lobes 130d at diametrically opposite places where (FIGS. 18 and 21) the cam is spaced from collar 40e.

Cam 130 is rotated by the pedal through a "lost-motion" coupling to sheave disc 112. The lost motion coupling scheme is operatively connected with the gate adjustment means for avoiding additional shifts of the gate before all of the sheave segments are shifted to similar positions. This prevents the shifting of individual segments beyond the design limits of the gate. The hub portion of disc 112 has a small projection 112c (FIG. 19). That projection moves in a circular path as pedal crank 28 turns sheave 42. Two-lobe cam 130 has a projection 130e that is disposed in that circular path. When crank 28 is turned in either direction, projection 112c reaches projection 130e. Continued operation of pedal crank 28 drives cam 130. However, if turning of the pedal is reversed, the pedal operates sheave 42 but that motion is "lost" for nearly a full revolution in relation to cam 130. At that moment, projection 112c again engages projection 130e so that the drive coupling of the pedal to cam 130 is restored. The purpose of this "lost-motion" coupling is discussed below.

A two-armed rocker 132 (best shown in FIGS. 18, 21 and 23) is supported on a fixed pivot 40f. This pivot projects inward from left-side wall 40. One arm 132a of the rocker (FIGS. 18 and 23) carries a roller 132b that is received between walls 130c (FIG. 21) of the two-lobed cam 130. Another arm 132c of the rocker bears a pivot 132d. Bearing 134a at one end of the picker 134 fits on pivot 132d of the rocker. When two-lobed cam 130 rotates about its axis, rocker 132 is oscillated about pivot 40f, causing picker 134 to shift back and forth along its own length.

Figure 25:
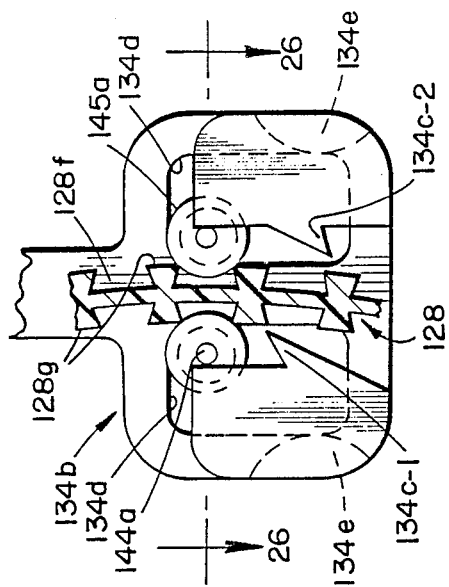
FIG. 25 is a greatly enlarged fragmentary view of certain adjustment components in one ("balanced") relationship, as seen at the plane 25—25 in FIG. 18.

It was mentioned above that circular rib 128a of stepped cam member 128 operates in groove 40d formed in left-side wall 40 of the casing. Rib 128a extends along that groove and into a cavity 40g in the right-side wall. Pivot 40f and pivot 40i project from wall area 40h which bounds cavity 40g. A head portion 134b of picker 134 provides spaced-apart oppositely directed hooks 134c-1 and 134c-2. As picker 134 reciprocates in cavity 40g, its hooks move back and forth along opposite sides of the toothed rib 128a. In FIG. 25, rib 128a is shown in cross-section at the plane 25—25 in FIG. 18, exposing head 134b. That portion of rib 128a which extends between the picker's hooks has a series of regularly spaced recesses 128f and teeth 128g. Hooks 134c-1 and 134c-2 are centered about rib 128a and the hooks are kept out of contact with teeth 128g so long as the transmission's ratio is to remain constant. Head 134b reciprocates idly along toothed rib 128a, portions 134e of head 134b sliding within ears 143d of tilt bar 103.

The following mechanism controls the position of head 134b relative to rib 128a. Cords 38 extending from the finger control of FIGS. 3 and 4 are separately identified for reference in FIGS. 23, 24 and 27 as 38-1 and 38-2. Each cord has a knot at its end, and each cord is received in the groove of a respective grooved slider 136. The cord can be quickly disconnected therefrom if the transmission is to be removed from the bicycle and replaced. A channel 138 forms a cover and guide for each slide 136. Channels 138 are suitably secured to the outside surface of left side wall 40, as by hooks 138a that lock in slots 40j and by other hooks 138b that lock into other holes (not shown) in casing wall 40. Posts 136a-1 and 136a-2 in FIGS. 24 and 27 extend through respective slots 40k, into cavity 40h.

A tilt-bar member 143 having equal-length arms 143a-1 and 143a-2 is supported on pivot 40i in recess 40h. Pivot 40i is located along the oscillation path of pivot 132d. Posts 143b-1 and 143b-2 at the ends arms 143a are normally against posts 136a-1 and 136a-2. This is achieved during installation of the transmission by pulling both cords 38 so that the knots at their ends are disposed at the ends of sliders 136; the separate cords 38 are drawn into the finger control 34 of FIGS. 3 and 4 to take up the slack in the cords, and finally the control is tightened to seize the cords.

Figure 26:
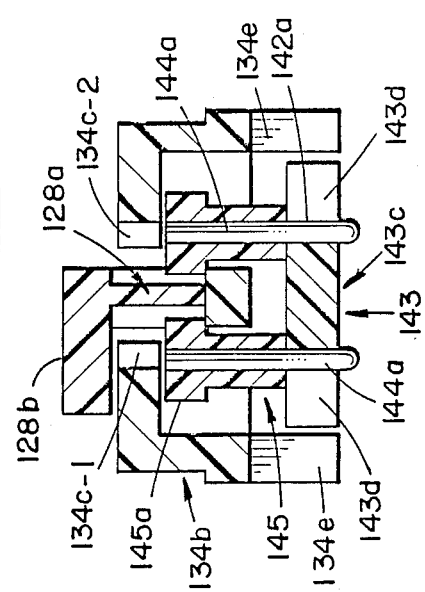
FIG. 26 is a cross-section of adjustment components of FIG. 18 as seen at the plane 26—26 in FIG. 25.
Figure 24:
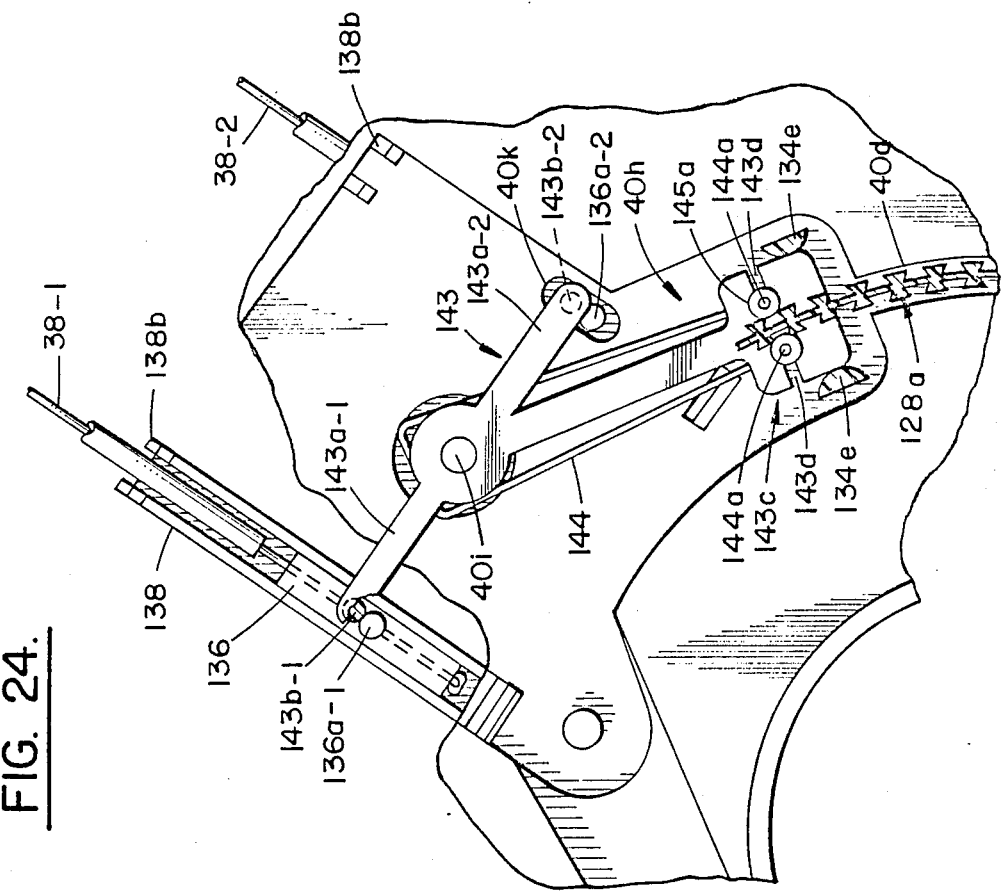
FIG. 24 is an enlarged fragmentary view of certain adjustment components in one ("balanced") relationship, as seen at the plane 24—24 in FIG. 18.
Figure 29:
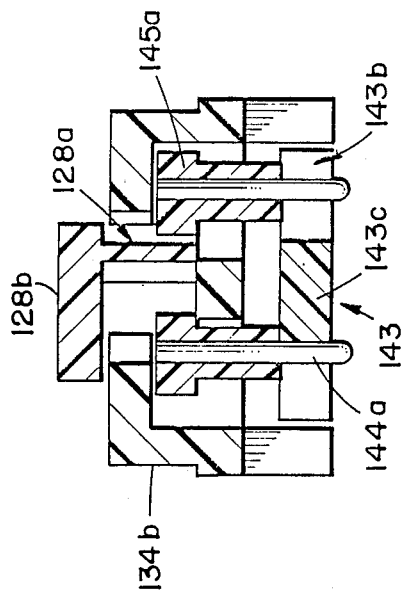

A further arm of the tilt bar 143 bears a head 143c having aligned slots 143d extending inward from its opposite edges. A generally U-shaped wire spring 144 has two arms extending from a bent middle portion which fits loosely around the bearing or hub of tilt bar member 143. As best shown in FIG. 23, the arms of spring 144 have right-angle bends so that there are upstanding portions 144a at the ends of the spring's arms. These right-angled wire portions 144a are received in slots 143d and they are biased toward each other, toward the innermost ends of the slots. As best seen in FIGS. 26 and 29, these wire portions 144a project through head 143c and serve as shafts for rollers 145 that are of plastic in this example. Rollers 145 have larger-diameter heads 145a which are biased by spring 144 for cooperation with recesses 128f at the opposite sides of toothed rib 128a. Rollers 145 on wire portions 144a extend through windows 134d in the head 134b of picker 134. The picker's head 134b has a pair of depending projections 134e that embrace head 143b of the tilt bar member. Projections 134e slide along the sides of tilt bar head 143b as rocker 132 reciprocates picker 134 along its length. So long as head 143b of member 143 is biased by spring ends 144a so as to be centered opposite rib 128a, the hooks 134c remain spaced from the rows of teeth 128g at the opposite sides of rib 128a.

Figure 28:
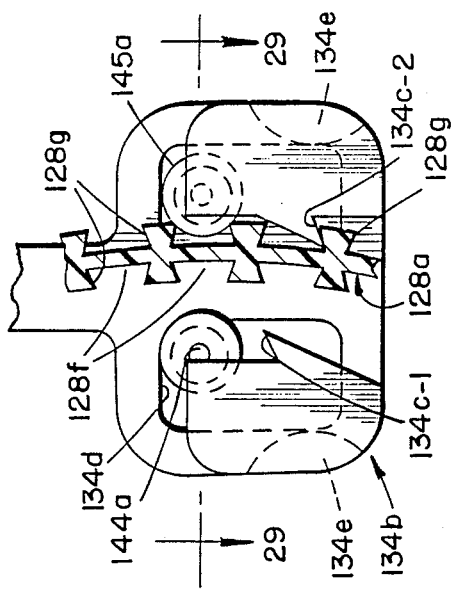
FIGS. 27, 28 and 29 are views like FIGS. 24, 25 and 26, respectively, with the components in another ("unbalanced") relationship.
Figure 27:
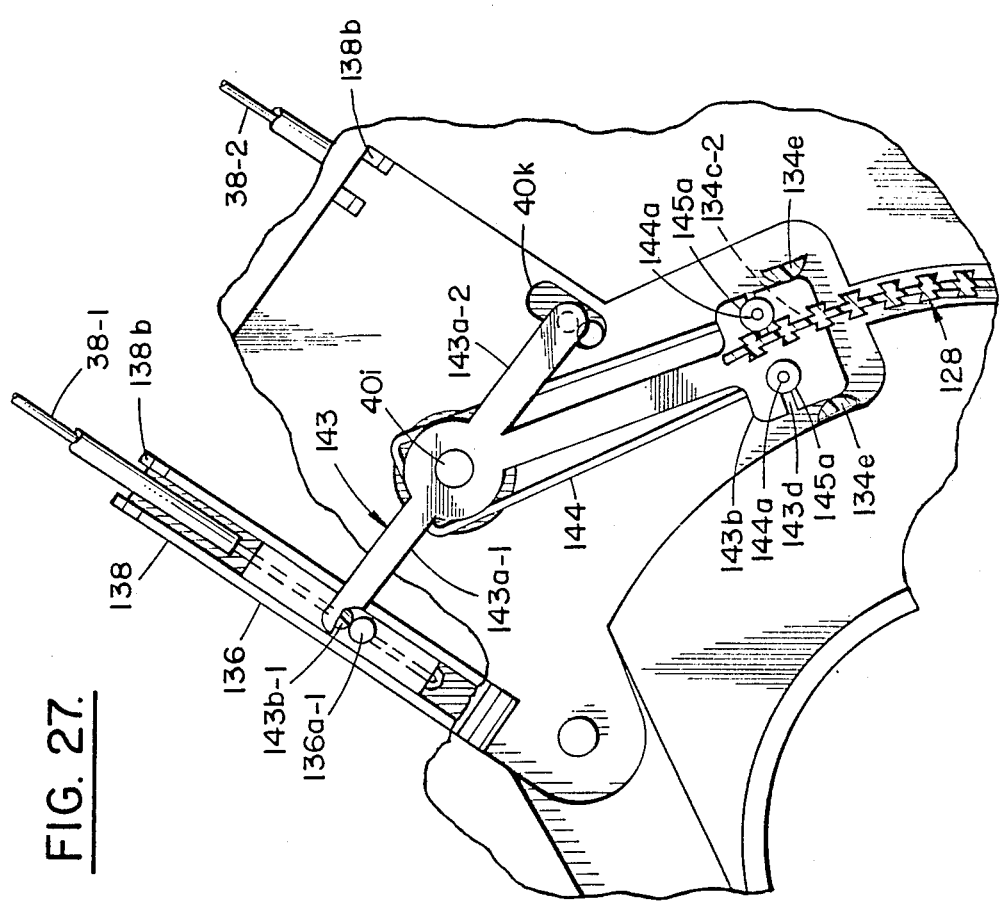

FIGS. 27–29 show the effect of applying finger effort to the control part 34 (FIGS. 3 and 4) so as to tension cord 38-1. That effort moves tilt-bar member 143 clockwise around its pivot, and causes head 143c (acting via projections 134e) to shift hook 134c-2 of the picker into cooperation with a toothed side of rib 128a.

The unbalancing of tilt-bar 143a caused by finger control 34 and cords 38 accomplishes nothing unless the pedal is turning. When two-lobed cam 130 is being rotated by drive from the pedal, rocker 134 oscillates twice abruptly for each rotation of the pedal crank and drives the picker head 134b back and forth along toothed rib 128a. Consequently hook 134c-2 engages and shifts a tooth 128g of rib 128a one step during one stroke of the picker head. Hook 134c-2 ratchets past the next tooth 128g during the opposite stroke of head 134b. The other hook 134c-1 is lifted well away from toothed rib 128a by tilt-bar head 143c. At least one spring-biased roller 145 always engages rail 128a, so that these rollers act as detents to hold cam member 128 in position following any driving stroke of tooth 134c-1 or 134c-2.

Hook 134c-2 operates toothed rib 128a clockwise (as viewed in FIGS. 27 and 28) one step for each half rotation of cam 130 so long as the tilt bar member 143 is held unbalanced. Manual control 34 of FIGS. 3 and 4 may be operated oppositely, so as to cause member 143 to tilt counterclockwise from its balanced condition in FIG. 24. The effect of applying tension to cord 38-2 is to cause hook 134c-1 to cooperate with toothed rib 128a. Then toothed rib 128a is shifted one step counterclockwise for each oscillation of rocker 132.

Teeth 128g correspond to most of the dwells of stepped cam 128c. Hooks in pawls 134c-1 and 134c-2 drive stepped cam 128c from one end of its range to the opposite end. Beyond that range, curved rib 128a has smooth areas engaged by hooks or pawls 134c-1 and 134c-2. Therefore, holding manual control 34 in position for continued cooperation of those hooks or pawls with curved (and smooth) rib 128a after either end of stepped cam 128c has reached cam followers 52f has no effect.

Operation of stepped cam 128c shifts member 52 stepwise. Conversely, if force were applied to member 52 along groove 40d, member 52 would not index the sector cam. This is a one-way drive mechanism such that cam 128c operates adjustment member 52, but any force applied by adjustment member 52 to cam 128c cannot cause the cam to turn. The dwells of stepped cam 128c serve as positive obstructions against any shift of member 52 (parts 52a and 52b) that might be caused by mechanical shocks to the whole transmission. Relatively light forces of detent rollers 145 against toothed rib 128a are effective for securely detenting the whole mechanism. The dwells of stepped cam 128c act precisely and positively for locating gates 56 and 58 in the discrete positions that correspond to the discrete positions of the sheave segments 46 and 48.

The operation of the entire apparatus may be reviewed briefly. So long as finger control 34 remains centered, tilt-bar member 143 is balanced and its head 143b controls picker head 134b so that hooks 134c-1 and 134c-2 remain out of engagement with the teeth 128g of rib 128a. While the tilt bar is unbalanced, picker head 134b indexes toothed rib 128a step-by-step as the pedal crank 28 turns. The entire ratio-adjusting mechanism is arrested in its last adjusted position between changes.

While the ratio of the transmission remains unchanged, the mechanism of FIG. 5A remains stationary. Belt 50 is held by idlers 60 and 62 so as to wrap around most of the sheave segments of each of the sheaves 42 and 44. Gates 56 and 58 remain in their last-set discrete positions. Those discrete positions of the gates track with the distribution of the teeth 86 which hold the sheave segments in place. The ratio indicating characters 129b are displayed at window 131 for each setting of cam 128c and gates 56 and 58.

Each sheave segment 48 of the rear sheave 44 is adjustable along paired slots in the two discs 82 and 84; paired rows of teeth 86 in each of the slots mesh with a group of teeth 48e on each end portion 48b of each sheave segment 48; locking rails 90 are disposed between each of the sheave end portions 48b and the opposite edge of each slot; the locking rails 90 have teeth 90a that mate with teeth 88 along the slot's edge; teeth 88 and 90a having mutually cooperating locking flat tops and ramps; flippers 94 coordinate the pairs of locking rails; and cam assembly 96 controls flippers 94 and rails 90. Sheave 42 and its sheave segments 46 are like sheave 44 and its sheave segments 48 in all these respects and in all the further details of sheave 44 described above in relation to the sheave segments and their selective positioning and locking mechanism but cam assembly 96 is replaced.

Sheave 42 has a cam assembly 146 for operating flippers 94 of the front sheave that closely resembles cam assembly 96 that operates flippers 94 of the rear sheave.

Cam assembly 146 (FIG. 18) is a unit like cam assembly 96 in all respects except that pivoted wings 96e and 96f in their positions represented in FIG. 15 are replaced by fixed wall portions of the box cam, and springs 97 of FIG. 15 are omitted from cam assembly 146. Apart from that change, cam assembly 146 incorporates suitably dimensioned replicas (not shown) of sheave-releasing cam segment 96d and leaf-spring 95 and the surface 96h which controls the contour and the position of that portion of spring 95 which acts as a resilient wall portion of the cam track. The sequence of operations that occur as each sheave segment 46 enters and then leaves the adjustment zone (where belt 50 is disengaged from sheave segments 46) is as described above in detail for the rear sheave. As already noted, wings 96e and 96f of cam assembly 96 are not used in cam 146 of the front sheave. The apex-to-apex tooth condition shown in FIG. 14C that might occur rarely in the rear sheave does not occur in the operation of the front sheave. This is because the adjusting mechanism is timed to complete the adjustment of gate 56 before the cusps of gate cams 56a and 56b leave the nubbins of sheave segments 46.

Sector cam 128c is shifted step-by-step when the transmission ratio is being changed. Adjustment member 52 is shifted abruptly as cam followers 128f are driven abruptly from one dwell to the next by the transitions between the dwells of the stepped sector cam 128c. These abrupt shifts of the stepped cam 128c are caused by lobes 130d of cam 130; they are timed so that the gate 56 has moved at least approximately to each new setting as or just before the nubbins pass the cusps of the gate cams. This timing is consistent and predictable. Accordingly, the problem of apex-to-apex abutment of teeth which arises in the operation of the rear sheave does not arise at the front sheave, so that wings 96e and 96f of the rear cam assembly 96 can be omitted from the front cam assembly 146.

As the rear gate 58 is adjusted in or out radially, idler roller 62 is also carried in and out, for maintaining a practical maximum wrap of belt 50 around sheave segments 48 corresponding to changes in the sheave's adjusted radius. Supporting pivot 56j (FIG. 22) of the front idler is also shifted in coordination with gate 56 for maintaining a practical maximum wrap of the belt around sheave segments 46. These coordinated adjustments of the idler supports may not be just right for maintaining belt 50 taut. Springs 126a, 126b act on pivoted support 124 of idler 60 to take up the slack in the belt, whether due to less-than-ideal adjustments of the idlers or due to the other causes.

Member 52 (parts 52a and 52b) adjusts gates 56 and 58 and coordinately adjusts idlers 60 and 62 for establishing a desired transmission ratio. Modest mechanical effort is required for such adjustment. However, mechanism 54 reduces this effect still further by utilizing the power of the pedal crank to make the adjustments, requiring only slight finger effort that is applied to control 34.

Picker 154 is oscillated along toothed rib 128a by rocker 132, driven by two-lobed cam 130. The picker oscillates idly so long as it is retained by head 143b in a neutral position relative to rib 128a. When a cord 38 unbalances the tilt bar, one hook 134c-1 or 134c-2 of picker head 134b advances rib 128a and stepped cam 128c and member 52 by one-tooth steps corresponding to the teeth 128g of the rib 128a. Each one-step shift of the two gates 56 and 58 takes place when pedal crank 28 drives two-lobed cam 130 through 180°. During the time involved in making the one-step adjustment of gate 56, sheave 42 also turns through 180°. Consequently, half of the sheave segments 46 are adjusted one step during a one-stroke operation of mechanism 54 by two-lobed cam 130. Manual or finger control 34 may be released after gates 56 and 58 have been shifted one step. Continued turning of sheaves 42 and 44 then causes all sheave segments 46 to become adjusted one step to a new common radius and causes all sheave segments 48 to become adjusted one step to a different common radius. A new transmission ratio is established in this manner.

More than a one-step ratio change may be desired. If so, manual or finger control 34 is held in position deflected from neutral so that a tensioned cord continues to hold tilt-bar member 143 unbalanced. Hook 134c-1 or 134c-2 of head 134 continues to shift rib 128a and stepped cam 128c and all of the coordinating adjustment assembly of FIG. 5A through one step of adjustment for each half-rotation of two-lobed cam 130. During 180° of crank rotation, half of the sheave segments will have been advanced one step. Continued rotation will advance the gates one more step before the last of the segments has been exposed to the gate. Thereafter, all segments will advance one step per one-half crank rotation, requiring each to advance two steps as they approach and are moved by the constantly advancing gate. After the finger control is released and during continued rotation of sheave 42, all of the sheave segments of sheave 42 are adjusted further until they are set at a common radius. Roughly the same performance occurs at rear sheave 44.

A particular condition arises when the transmission ratio is being adjusted at the lowest-speed portion of its range, when sheave 44 turns slower than sheave 42. During continuing ratio changes, each sheave segment 46 of the front sheave would shift two steps for each rotation of sheave 42, but three-step changes would occur in the course of adjusting sheave segments 48, which cannot be accommodated by the rear gates. This problem is solved by providing longer dwells 128h at the low-speed end of the transmission's range of ratios. Most dwells of cam 128c change once for each one-step advance of curved ratchet 128a, but at the low-speed end of the range of ratios, each dwell is twice as long. It requires two strokes of the ratchet-and-pawl mechanism 128a/134c-1 and 134c-2 for changing from one double-length dwell 128h to the next of cam 128c. The ratio-indicating numbers 128b on indicator strip 129 will then have duplications, for example 6-5-4-3-3-2-2-1-1.

Providing cam 130 with two lobes expedites large changes of the transmission ratio. Cam 130 can be made with only one lobe. Making a large change in the transmission ratio then would be slower because twice as many pedal rotations would be required with a one-lobe cam than with a two-lobe cam to make the same change of transmission ratio.

Projections 112c and 130e provide a lost-motion coupling between pedal crank 28 and cam 130. Pedal crank 28 can move through nearly a whole revolution before projection 112c of sheave 42 reaches projection 130e and starts to drive cam 130. If projection 112c is in driving relation to projection 130e in one driving direction of the pedal, and if the pedal's direction is reversed, pedal crank 28 will not again come into driving relation to cam 130 until it moves through nearly a full idle rotation, a "lost" motion.

The provision of this lost-motion coupling between the pedal crank and the mechanism that adjusts gates 56 and 58 provides a safeguard against mis-operation. If there were no "lost" motion, cam 130 would be fixed to pedal crank 26 and sheave 42. A person could then press finger control 34 to one side, away from neutral and, at the same time, pedal crank 28 could be oscillated back and forth through a small angle. If that were to occur, the coordinating mechanism of FIG. 5A would shift progressively through many steps and several of the sheave segments 46 and 48 would move back and forth through gates 56 and 58. As a result, a few sheave segments 46 and 48 would be shifted to new radial adjustments but many more sheave segments would remain in their previous adjusted positions. The sheave segments remaining in their previous positions would be outside the operative range of the newly positioned gates. That combination of conditions (deflected finger control and short-stroke back-and-forth operation of pedal 28) is extremely unlikely. However, the consequence of such occurrence is precluded by providing a wide-range lost-motion coupling between the drive of the sheaves by pedal crank 28 and the incremental drive 132—128 of the adjustment mechanism. The range of lost motion for this purpose should be sufficient to insure cooperation of all the sheave segments with their gates during each direction of pedal rotation at both minimum and maximum ratio of the transmission.

The sheave-adjusting mechanism is ordinarily operated while the bicycle is being pedaled. For example, while the rider is going uphill, the finger control 34 can be deflected to cause the ratio to be adjusted for lower speed, higher torque at the rear wheel. However, the transmission ratio can be adjusted under other circumstances. For example, while the bicycle rider is coasting and if there is a steep hill ahead, the transmission can be adjusted to a low-speed ratio by pedaling backward while deflecting manual control 34. This mode of operation is possible both because the entire transmission can be operated in reverse, thereby turning rear sheave 44 backward and because the over-running clutch allows the transmission to operate without driving the rear wheel. The entire transmission can be operated in either direction by pedaling forward or backward in changing the transmission ratio, so that the bicycle rider is not compelled to pedal the bicycle forward in order to change the transmission ratio.

The entire transmission is of a construction that is adapted to be protected from road dirt by the illustrated enclosure. The parts of the enclosure are of molded plastic, for example, incorporating seals between the stationary parts and where the rotary front and back sheaves and the clutch enclosing wall 70 fit against circular formations of the enclosure.

The nature of the transmission is such that most of its parts can be made of relatively inexpensive lightweight molded plastic parts. As a result, the entire transmission can weigh substantially less than traditional chain and sprocket transmissions, an attractive consideration to bicycle riders, and its cost is modest. Many more transmission ratios are provided in the illustrated example than in multi-speed chain drives, and, unlike usual multi-speed transmission, the illustrative transmission includes a prominent indicator showing the transmission ratio.

In addition, it will be appreciated that the transmission can be easily and quickly removed from the bicycle for replacement, a feature not found in conventional chain and sprocket systems. By virtue of the quick disconnect feature of the control cords, the threaded pedal crank by which the front or drive sheave can be simply disconnected, and the split clutch with its driving clutch unit united to the driven member, the transmission is easily and quickly removed from the bicycle frame.

It should be understood that the foregoing description is only illustrative of the invention. Various alternatives and modifications can be devised by those skilled in the art without departing from the invention. Accordingly, the present invention is intended to embrace all such alternatives and variances which fall within the scope of the appended claims.

What is claimed is:

1. A bicycle including frame, wheels, ratio control, and ratio-changing mechanism comprising:
   ratio-changing mechanism having driving and driven rotatable members supported by the frame, the driven member being connected to a wheel and the driving member being connected to a power source;
   means for imparting motion to the driving means;
   one-way driving clutch means between the driven member and said wheel, the clutch means including a driving clutch unit united to the driven member and a driven clutch unit united to said wheel, the driven clutch unit and said wheel forming a wheel assembly that is slidably removable from said driving clutch unit, with both said clutch units remaining united to their respective members after said removal, the clutch units being in operative relation to each other when the wheel assembly is assembled to the bicycle and the clutch units being separated from each other when the wheel assembly is removed from the bicycle.

2. A bicycle as in claim 1 wherein the clutch has first and second engaging means that have a driving relationship for one direction of movement on the driving clutch unit and an over-running relationship for the opposite direction of the driving clutch unit, one of the clutch units including the first engaging means and a companion member that move in unison, the first engaging means being slidable to and away from the companion member, spring means for biasing the first engaging means toward the second engaging means and stop means limiting the movement of the first engaging member towards the second engaging member whereby when said wheel is removed from the rest of the bicycle and is subsequently reassembled, the first and second engaging means are restored to the one-way driving relationship.

3. A bicycle as in claim 1 further including an enclosure around the ratio-changing mechanism in the region of the one-way clutch, the driven clutch unit having means for sealingly coupling it to the enclosure for enclosing the clutch parts without impeding removal of said wheel assembly from the rest of the bicycle.

4. A bicycle including frame, wheels, transmission control connected by cable means to a radio-changing transmission in which the transmission may be easily and quickly removed for replacement comprising:
   ratio-changing transmission having drive and driven rotatable members, the driven member being connected to a wheel and the drive member being connected to the frame;
   means for imparting motion to the drive member on the frame the means for imparting motion supporting the drive member on the frame;
   one-way driving clutch means between the driven member and said wheel, the clutch means including a driving clutch unit united to the driven member and a driven clutch unit united to said wheel, the driven clutch unit and said wheel forming a wheel assembly that is slidably removable from said driven clutch unit, with both said clutch units remaining united to their respective member after said removal, the clutch units being in operative relation to each other when the wheel assembly is assembled to the bicycle and the clutch units being separated from each other when the wheel assembly is removed from the bicycle, the driving clutch unit being united with the transmission and being removable from the frame with the transmission; and
   quick disconnect means for disconnecting the cable means from the transmission whereby the transmission may be completely removed from the bicycle by simply and quickly disconnecting the cable means from the transmission, disconnecting the means for imparting motion from the driving member and disconnecting the driven member and associated wheel from the frame.

5. A bicycle as in claim 4 wherein the means for imparting motion is a pedal crank and upon removing at least a portion of the pedal crank the driving member is disconnected therefrom.

* * * * *